United States Patent
Ikeda et al.

(10) Patent No.: US 11,477,356 B2
(45) Date of Patent: Oct. 18, 2022

(54) IMAGE CAPTURING APPARATUS, CONTROL METHOD THEREOF, AND NON-TRANSITORY COMPUTER-READABLE STORAGE MEDIUM

(71) Applicant: CANON KABUSHIKI KAISHA, Tokyo (JP)

(72) Inventors: Hitoshi Ikeda, Kawasaki (JP); Shinya Ishita, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/459,295

(22) Filed: Aug. 27, 2021

(65) Prior Publication Data

US 2021/0392250 A1    Dec. 16, 2021

Related U.S. Application Data

(62) Division of application No. 16/448,685, filed on Jun. 21, 2019, now Pat. No. 11,146,714.

(30) Foreign Application Priority Data

Jun. 25, 2018  (JP) .............................. JP2018-120040
Jul. 17, 2018   (JP) .............................. JP2018-134477

(51) Int. Cl.
*H04N 5/225* (2006.01)
*H04N 5/232* (2006.01)
*G06T 11/60* (2006.01)

(52) U.S. Cl.
CPC ........... *H04N 5/2254* (2013.01); *G06T 11/60* (2013.01); *H04N 5/23229* (2013.01); *H04N 5/232133* (2018.08)

(58) Field of Classification Search
CPC ........... H04N 5/2254; H04N 5/232133; H04N 5/23229; H04N 5/23245; H04N 5/232933;
(Continued)

(56) References Cited

U.S. PATENT DOCUMENTS 7,136,096 B1 * 11/2006 Yamagishi ....... H04N 5/232935
348/39
8,416,282 B2 * 4/2013 Lablans ............. H04N 5/23238
348/36

(Continued)

FOREIGN PATENT DOCUMENTS

CN    101086603 A    12/2007
CN    101849406 A    9/2010
(Continued)

OTHER PUBLICATIONS

Communication dated Nov. 18, 2019 from a foreign patent office in a counterpart foreign application, JP 2018-120040, which is enclosed without translation.
(Continued)

*Primary Examiner* — Chiawei Chen
(74) *Attorney, Agent, or Firm* — Cowan, Liebowitz & Latman, P.C.

(57) ABSTRACT

An image capturing apparatus which a lens unit is interchangeable, comprises an image capturing unit which captures images using an image sensor, an synthesizing unit which synthesizes a plurality of images, and a controlling unit which controls predetermined synthesis processing for creating a synthetic image by causing the synthesizing unit to synthesize a plurality of images that have been obtained by the image capturing unit performing image capturing a plurality of times, wherein, if it is judged that a lens unit that has been replaced after a first image for the synthesis processing was acquired is a lens unit having an image circle
(Continued)

that is different from that of a lens unit that was mounted before the replacement, the controlling unit controls the image capturing unit to not capture a new image for creating the synthetic image.

10 Claims, 19 Drawing Sheets

(58) Field of Classification Search
CPC .. H04N 5/2355; H04N 5/232; H04N 5/23216; H04N 5/2353; H04N 5/23232; H04N 5/35536; G06T 11/60
See application file for complete search history.

(56) References Cited

U.S. PATENT DOCUMENTS

| | | | |
|---|---|---|---|
| 9,066,034 B2* | 6/2015 | Yahata | G06T 5/50 |
| 2002/0089596 A1* | 7/2002 | Suda | H04N 5/2254 |
| | | | 348/E3.032 |
| 2006/0056049 A1* | 3/2006 | Tokiwa | H04N 5/22521 |
| | | | 348/E5.025 |
| 2016/0037046 A1 | 2/2016 | Nashizawa | |
| 2017/0171449 A1 | 6/2017 | Kino | |
| 2018/0139395 A1 | 5/2018 | Toyoda | |
| 2019/0327408 A1* | 10/2019 | Kawarada | H04N 5/232133 |

FOREIGN PATENT DOCUMENTS

| | | | |
|---|---|---|---|
| CN | 107707693 A | | 2/2018 |
| JP | H11-345317 A | | 12/1999 |
| JP | 2000-175185 A | | 6/2000 |
| JP | 2001-339734 A | | 12/2001 |
| JP | 2002-218313 A | | 8/2002 |
| JP | 2003-061048 A | | 2/2003 |
| JP | 2007-158935 A | | 6/2007 |
| JP | 2007-221237 A | | 8/2007 |
| JP | 2007-311869 A | | 11/2007 |
| JP | 2012-019343 A | | 1/2012 |
| JP | 2012-235229 A | | 11/2012 |
| KR | 10-2009-0059512 A | | 6/2009 |
| WO | 2010/053759 A2 | | 5/2010 |

OTHER PUBLICATIONS

British Search Report dated Dec. 10, 2019, which is enclosed, that issued in the corresponding U.K. Patent Application No. GB1908877.2.

May 8, 2020 Japanese Office Action, which is enclosed without an English Translation, that issued in Japanese Patent Application No. 2018-120040.

Jan. 14, 2021 Chinese Office Action, which is enclosed with an English Translation, that issued in Chinese Patent Application No. 201910554373.6.

\* cited by examiner

301

302

303

IMAGE SENSOR SURFACE

LENS UNIT HAVING
LARGE IMAGE CIRCLE

RAW IMAGE WHEN SHOT USING LENS
UNIT HAVING LARGE IMAGE CIRCLE

1100

LENS UNIT HAVING
SMALL IMAGE CIRCLE

RAW IMAGE WHEN SHOT USING LENS
UNIT HAVING SMALL IMAGE CIRCLE

IMAGE CAPTURING APPARATUS, CONTROL METHOD THEREOF, AND NON-TRANSITORY COMPUTER-READABLE STORAGE MEDIUM

CROSS-REFERENCE TO RELATED APPLICATIONS

This application is a divisional of application Ser. No. 16/448,685, filed Jun. 21, 2019, the entire disclosures of which is hereby incorporated by reference.

BACKGROUND OF THE INVENTION

Field of the Invention

The present invention relates to an image capturing apparatus, a control method thereof, and a non-transitory computer-readable storage medium.

Description of the Related Art

There are digital cameras that can perform so-called multiple-exposure imaging in which one synthetic image is obtained by synthesizing a plurality of shot images, and the synthetic image is recorded. There are digital cameras in which the number of images to be synthesized or the method of synthesis processing such as weighted average, synthesis of relatively bright portions, or synthesis of relatively dark portions can be selected before shooting is performed, and there are also digital cameras in which an image that has already been shot can be selected as a base image, and a multiplexed image can be created by synthesizing an image to be shot on the base image.

Japanese Patent Laid-Open No. 2012-19343 and Japanese Patent Laid-Open No. 2007-221237 disclose a technique for changing setting mid-multiple-exposure imaging. Japanese Patent Laid-Open No. 2012-19343 discloses a technique in which the setting of the aspect ratio of an image to be recorded can be changed mid-shooting, in a digital camera that can perform multiple-exposure imaging. Also, Japanese Patent Laid-Open No. 2007-221237 disclose a technique in which settings such as recording quality and recording size can be changed mid-shooting, in a digital camera that can perform multiple-exposure imaging.

In an interchangeable lens type camera, the lens unit can be replaced while multiple-exposure imaging is being performed. There are various types of replaceable lens units, and it is conceivable that an unnatural synthetic image is generated depending on a replaced lens unit.

SUMMARY OF THE INVENTION

The present invention in its first aspect provides an image capturing apparatus which can interchange a lens unit, comprising: an image capturing unit which captures images using an image sensor; a synthesizing unit which synthesizes a plurality of images; and a controlling unit which controls predetermined synthesis processing for creating a synthetic image by causing the synthesizing unit to synthesize a plurality of images that have been obtained by the image capturing unit performing image capturing a plurality of times, wherein, if it is judged that a lens unit that has been replaced after a first image for the synthesis processing was acquired is a lens unit having an image circle that is different from that of a lens unit that was mounted before the replacement, the controlling unit controls the image capturing unit to not capture a new image for creating the synthetic image.

The present invention in its second aspect provides an image capturing apparatus which can interchange a lens unit, comprising: an image capturing unit which captures images using an image sensor; a synthesizing unit which synthesizes a plurality of images; and a controlling unit which controls predetermined synthesis processing for creating a synthetic image by causing the synthesizing unit to synthesize a plurality of images that have been obtained by the image capturing unit performing image capturing a plurality of times, wherein, if it is judged that a lens unit that has been replaced after a first image for the synthesis processing was acquired is a lens unit that necessitates predetermined image correction, the controlling unit controls the image capturing unit to not capture a new image for creating the synthetic image.

The present invention in its third aspect provides a control method of an image capturing apparatus which can interchange a lens unit and includes an image capturing unit which captures images using an image sensor, comprising: synthesizing a plurality of images; and controlling predetermined synthesis processing for creating a synthetic image by causing the synthesizing to synthesize a plurality of images that have been obtained by the image capturing unit performing image capturing a plurality of times, wherein, if it is judged that a lens unit that has been replaced after a first image for the synthesis processing was acquired is a lens unit having an image circle that is different from that of a lens unit that was mounted before the replacement, the image capturing unit is controlled to not capture a new image for creating the synthetic image.

The present invention in its fourth aspect provides a control method of an image capturing apparatus which can interchange a lens unit and incudes an image capturing unit which captures images using an image sensor, comprising: synthesizing a plurality of images; and controlling predetermined synthesis processing for creating a synthetic image by causing the synthesizing to synthesize a plurality of images that have been obtained by the image capturing unit performing image capturing a plurality of times, wherein, if it is judged that a lens unit that has been replaced after a first image for the synthesis processing was acquired is a lens unit that necessitates predetermined image correction, the image capturing unit is controlled to not capture a new image for creating the synthetic image.

The present invention in its fifth aspect provides a non-transitory computer-readable storage medium storing a program which causes, when read and executed by a computer, the computer to execute steps pf a control method of an image capturing apparatus which can interchange a lens unit and includes an image capturing unit which captures images using an image sensor, the method comprising: synthesizing a plurality of images; and controlling predetermined synthesis processing for creating a synthetic image by causing the synthesizing to synthesize a plurality of images that have been obtained by the image capturing unit performing image capturing a plurality of times, wherein, if it is judged that a lens unit that has been replaced after a first image for the synthesis processing was acquired is a lens unit having an image circle that is different from that of a lens unit that was mounted before the replacement, the image capturing unit is controlled to not capture a new image for creating the synthetic image.

The present invention in its sixth aspect provides a non-transitory computer-readable storage medium storing a program which causes, when read and executed by a computer, the computer to execute steps of a control method of an image capturing apparatus which can interchange a lens unit and incudes an image capturing unit which captures images using an image sensor, the method comprising: synthesizing a plurality of images; and controlling predetermined synthesis processing for creating a synthetic image by causing the synthesizing to synthesize a plurality of images that have been obtained by the image capturing unit performing image capturing a plurality of times, wherein, if it is judged that a lens unit that has been replaced after a first image for the synthesis processing was acquired is a lens unit that necessitates predetermined image correction, the image capturing unit is controlled to not capture a new image for creating the synthetic image.

The present invention in its seventh aspect provides an image capturing apparatus which can interchange a lens unit, includes an image capturing unit, and creates a synthetic image from a plurality of images obtained by the image capturing unit performing a plurality of times of image capturing, the image capturing apparatus comprising: a detecting unit which detects remounting of a lens unit; a determining unit which determines, when the detecting unit has detected remounting of a lens unit, a region with respect to which image data of an image sensor included in the image capturing unit is extracted based on an image circle of the remounted lens unit; an acquiring unit which acquires image data with respect to the region determined by the determining unit from the image sensor; a judging unit which judges, when synthesizing image data of interest acquired by the acquiring unit and image data on which synthesis is to be performed, whether or not the image size of the image data of interest is the same as the image size of the image data on which synthesis is to be performed; and a synthesizing unit which creates new synthesis image data on which synthesis is to be performed by synthesizing the image data of interest and the image data on which synthesis is to be performed based on a result judged by the judging unit, wherein the synthesizing unit, if the judging unit has judged that the image size of the image data of interest is the same as the image size of the image data on which synthesis is to be performed, creates the new image data on which synthesis is to be performed that has the same image size as the image on which synthesis is to be performed by synthesizing the image data of interest and the image data on which synthesis is to be performed, and if the judging unit has judged that the image size of the image data of interest is different from the image size of the image data on which synthesis is to be performed, sets a position at which an image represented by the image data of interest and an image represented by the image data on which synthesis is to be performed is to be synthesized, and a size of an image represented by the synthesized image data, and creates the new image data on which synthesis is to be performed based on the setting.

The present invention in its eighth aspect provides a control method of an image capturing apparatus which can interchange a lens unit, includes an image capturing unit, and creates a synthetic image from a plurality of images obtained by the image capturing unit performing a plurality of times of image capturing, the method comprising: detecting remounting of a lens unit; determining, when remounting of a lens unit is detected in the detecting, a region with respect to which image data of an image sensor included in the image capturing unit is extracted based on an image circle of the remounted lens unit; acquiring image data with respect to the region determined in the determining from the image sensor; judging, when synthesizing image data of interest acquired in the acquiring and image data on which synthesis is to be performed, whether or not the image size of the image data of interest is the same as the image size of the image data on which synthesis is to be performed; and creating new image data on which synthesis is to be performed by synthesizing the image data of interest and the image data on which synthesis is to be performed based on a result judged in the judging, wherein in the creating, if the image size of the image data of interest is judged as being the same as the image size of the image data on which synthesis is to be performed in the judging, the new image data is created on which synthesis is to be performed having the same image size as the image on which synthesis is to be performed by synthesizing the image data of interest and the image data on which synthesis is to be performed, and if the image size of the image data of interest is judged as being different from the image size of the image data on which synthesis is to be performed in the judging, a position is set at which an image represented by the image data of interest and an image represented by the image data on which synthesis is to be performed is to be synthesized, a size of an image represented by the synthesized image data is set, and the new image data on which synthesis is to be performed is created based on the setting.

The present invention in its ninth aspect provides a non-transitory computer-readable storage medium which causes, when read and executed by a computer, the computer to execute step of a control method of an image capturing apparatus which can interchange a lens unit, includes an image capturing unit, and creates a synthetic image from a plurality of images obtained by the image capturing unit performing a plurality of times of image capturing, the control method comprising: detecting remounting of a lens unit; determining, when remounting of a lens unit is detected in the detecting, a region with respect to which image data of an image sensor included in the image capturing unit is extracted based on an image circle of the remounted lens unit; acquiring image data with respect to the region determined in the determining from the image sensor; judging, when synthesizing image data of interest acquired in the acquiring and image data on which synthesis is to be performed, whether or not the image size of the image data of interest is the same as the image size of the image data on which synthesis is to be performed; and creating new image data on which synthesis is to be performed by synthesizing the image data of interest and the image data on which synthesis is to be performed based on a result judged in the judging, wherein in the creating, if the image size of the image data of interest is judged as being the same as the image size of the image data on which synthesis is to be performed in the judging, the new image data is created on which synthesis is to be performed having the same image size as the image on which synthesis is to be performed by synthesizing the image data of interest and the image data on which synthesis is to be performed, and if the image size of the image data of interest is judged as being different from the image size of the image data on which synthesis is to be performed in the judging, a position is set at which an image represented by the image data of interest and an image represented by the image data on which synthesis is to be performed is to be synthesized, a size of an image represented by the synthesized image data is set, and the new image data on which synthesis is to be performed is created based on the setting.

Further features of the present invention will become apparent from the following description of exemplary embodiments (with reference to the attached drawings).

DESCRIPTION OF THE EMBODIMENTS

Hereinafter, embodiments of the present invention will be described in detail according to the attached drawings. Note that the configurations shown in the following embodiments are merely examples, and the present invention is not limited to the shown configurations.

Figure 1:
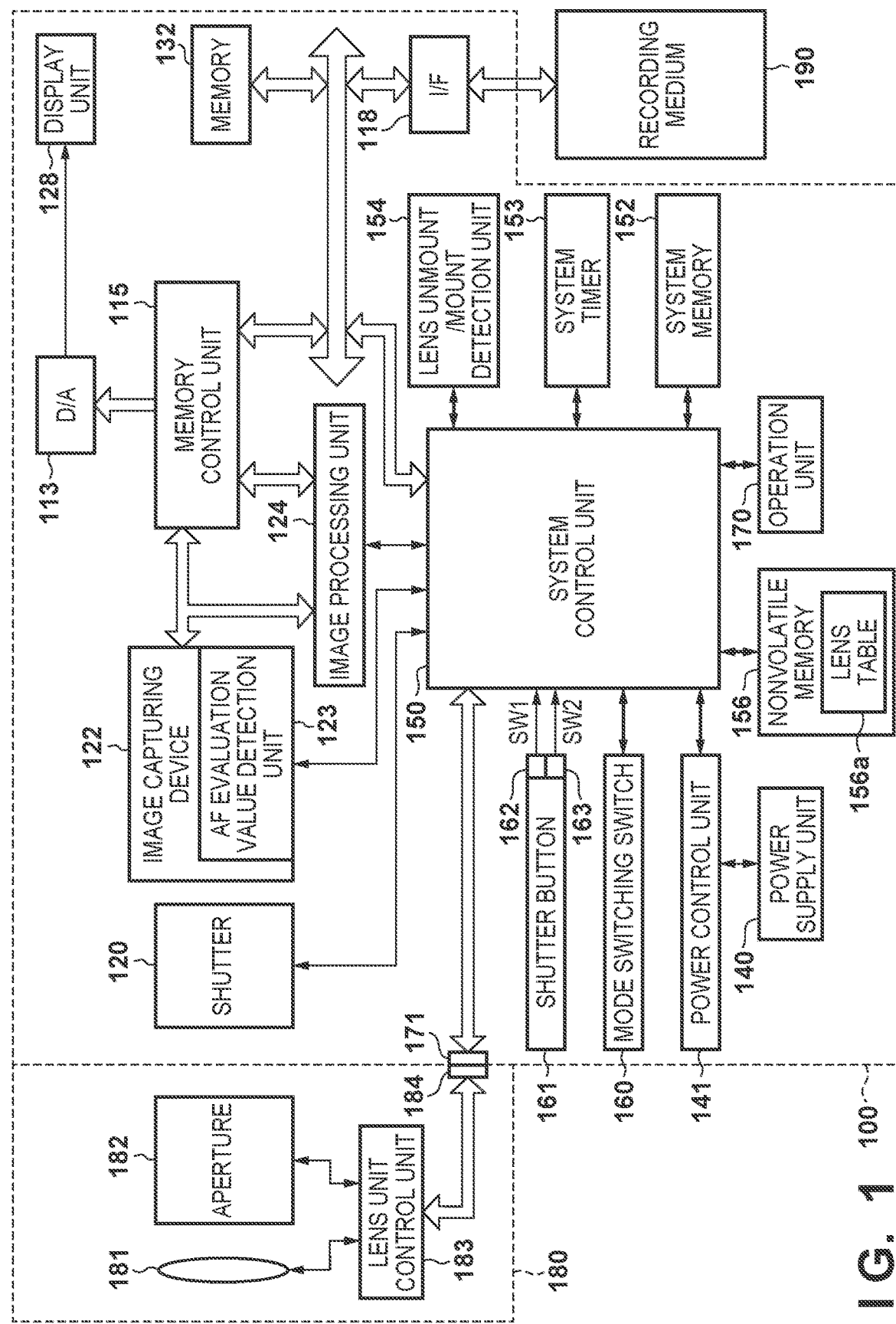
FIG. 1 is a block configuration diagram of an image capturing apparatus according to an embodiment.

FIG. 1 is a block configuration diagram of an image capturing apparatus typified by an interchangeable lens type digital camera in the embodiment. The image capturing apparatus in the embodiment is constituted by a main-body of the image capturing apparatus 100 and a lens unit 180 that can be mounted to/unmounted from the main-body of the image capturing apparatus 100.

In the main-body of the image capturing apparatus 100, a shutter 120 controls the exposure amount of a later-described image capturing device 122. The image capturing device 122 includes an image sensor that is constituted by a CCD or CMOS element that converts an optical image to an electric signal. R, G, and B color filters are arranged on a surface of the image sensor in a Bayer arrangement. Therefore, the image data immediately after obtaining of an image by the image capturing device 122 is constituted by pixel data obtained from pixels in the Bayer arrangement. Also, the image capturing device 122 has an A/D conversion processing function. An AF evaluation value detection unit 123 calculates an AF evaluation value from contrast information obtained from a digital image signal or a phase difference obtained from parallax images, and the image capturing device 122 outputs the obtained AF evaluation value to a system control unit 150. Note that the image sensor in the present embodiment is a so-called full-size sensor.

An image processing unit 124 performs predetermined pixel interpolation processing, resizing processing such as reduction, and color conversion processing on image data output from the image capturing device 122 or image data from a memory control unit 115. Also, the image processing unit 124 can acquire information regarding the distance between a subject and the image capturing apparatus. Specifically, the image processing unit 124 acquires the distance to a subject by detecting a phase difference between two given parallax images, and acquires information regarding distance to the subject from the image capturing apparatus for each pixel. Moreover, the image processing unit 124 performs predetermined computation processing using image data obtained by capturing an image, and the system control unit 150 performs exposure control and distance measurement control based on the computation result. Thus, AE (automatic exposure) processing and EF (automatic flash adjustment) processing of TTL (through-the-lens) type are performed. Also, the image processing unit 124 performs AF (autofocus) processing, and may use an output of the AF evaluation value detection unit 123 included in the image capturing device 122 when performing the AF processing. Moreover, the image processing unit 124 also performs predetermined computation processing using image data obtained by capturing an image, and performs AWB (automatic white balance) processing of the TTL type using the obtained computation result. Also, the image processing unit 124 also creates a multiplexed image by performing processing for synthesizing a plurality of images. Moreover, the image processing unit 124 converts RAW image data in a Bayer arrangement to image data including three components per pixel by performing debayering processing, and also performs encoding and decoding processing.

The output data of the image capturing device 122 is written into a memory 132 via the image processing unit 124 and a memory control unit 115, or directly written into the memory 132 via the memory control unit 115. The memory 132 stores image data that has been acquired by the image capturing device 122 and subjected to A/D conversion, and image data for display in a display unit 128. The memory 132 has a sufficient memory capacity for storing a predetermined number of still images and a moving image and audio of a predetermined length. Also, the memory 132 functions as a memory for image display (video memory). A D/A converter 113 converts data for image display stored in the memory 132 to analog signals and supplies the analog signals to the display unit 128. In this way, image data for display written into the memory 132 is displayed in the display unit 128 via the D/A converter 113. The display unit 128 performs display on a display such as an LCD in accordance with the analog signals from the D/A converter 113. The digital signals obtained by A/D conversion performed by the image capturing device 122 and stored in the memory 132 are converted into analog signals by the D/A converter 113, and the analog signals are successively transmitted to the display unit 128 for display, making it possible to realize an electronic viewfinder that performs through-the-lens image display.

A nonvolatile memory 156 is an electrically erasable and recordable memory, and is a flash memory or the like. Constants and programs, for example, for operating the system control unit 150 are stored in the nonvolatile memory 156. In this context, "programs" may refer to programs for executing various flowcharts that will be described later. Also, the nonvolatile memory 156 stores a lens table 156a in which a model name of a lens unit that can be connected to the main-body of the image capturing apparatus 100 is associated with characteristic information of the lens unit. The characteristic information of a lens unit includes the size of an image circle.

The system control unit 150 integrally controls the processing units of the main-body of the image capturing apparatus 100 by executing programs stored in the above-described nonvolatile memory 156. The reference sign 152 indicates a system memory, and is a RAM. Constants and variables for operating the system control unit 150, programs read out from the nonvolatile memory 156, and the like are deployed in the system memory 152.

A system timer 153 is a timer unit for measuring time periods for various types of controls and the time of an integrated clock. A mode switching switch 160, a first shutter switch 162 and a second shutter switch 163 that are included in a shutter button 161, and the operation unit 170 function as operation members for inputting various instructions to operate the system control unit 150. The mode switching button 160 switches the operation mode of the system control unit 150 to any of a still image recording mode, a moving image recording mode, and a reproduction mode. The still image recording mode includes an automatic shooting mode, an automatic scene determination mode, a manual mode, various types of scene modes in which different settings are configured for individual shooting scenes, a program AE mode, a custom mode, a multiple-exposure imaging mode, and the like. The mode can be directly switched to any of these modes by using the mode switching button 160. Alternatively, it is also possible to switch, using the mode switching button 160, to the still image recording mode and then to switch, using another operation member, to any of these modes included in the still image recording mode. Similarly, the moving image recording mode may also include a plurality of modes.

When the shutter button 161 provided in the main-body of the image capturing apparatus 100 is operated, that is, pressed half-way (the shooting preparation instruction), the first shutter switch 162 is turned on and generates a first shutter switch signal SW1. Upon receiving the first shutter switch signal SW1, the system control unit 150 starts AF (autofocus) processing, AE (automatic exposure) processing, AWB (automatic white balance) processing, EF (automatic flash adjustment) processing, and the like.

When the operation of the shutter button 161 is completed, that is, the shutter button 161 is pressed fully (the shooting instruction), the second shutter switch 163 is turned on and generates a second shutter switch signal SW2. Upon receiving the second shutter switch signal SW2, the system control unit 150 starts a series of shooting processing from reading out the signal from the image capturing device 122 to writing of image data to the recording medium 190.

By selecting various functional icons displayed on the display unit 128, appropriate functions for each situation are assigned to the operation members of the operation unit 170, and the operation members thus act as various function buttons. Examples of these function buttons include an end button, a back button, an image scrolling button, a jump button, a narrow-down button, and an attribute change button. For example, a menu screen that enables setting of various settings is displayed on the display unit 128 by pressing the menu button. The user can set various settings intuitively by using the menu screen, which is displayed in the display unit 128, four-direction (up, down, left, right) buttons, and a SET button. The menu screen that enables setting of various settings includes a screen for selecting, when the multiple-exposure imaging mode has been selected, an image that has been shot in the past and is recorded in the recording medium 190 as a base image, and the multiple-exposure imaging in which a shot image is synthesized on a selected base image is also possible. Moreover, a screen is also included for enabling selection as to whether or not the size of an image to be read out as a shot image is cropped to an APS-C sensor size, and if a setting for cropping is selected, shooting can be performed in the APS-C sensor size even in a case where a lens unit for a full-size sensor is mounted. This cropping processing will be described later using FIGS. 5A and 5B.

A power control unit 141 is constituted by, for example, a battery detection circuit, a DC/DC converter, a switch circuit for changing over the block to be supplied with power, and detects whether or not a battery has been inserted, the type of the battery, and the residual capacity thereof. Moreover, the power control unit 141 controls the DC/DC converter in accordance with the detection results and an instruction of the system control unit 150, and supplies a necessary voltage for a necessary length of time to each of the units including the recording medium 190.

A power supply unit 140 is constituted by a primary battery such as an alkaline battery or a lithium battery, a secondary battery such as a NiCd battery, a NiMH battery, or a lithium-ion battery, an AC adapter, or the like. The memory medium I/F 118 is an interface with a recording medium 190 such as a memory card or a hard disk. The recording medium 190 is a memory medium such as a memory card for recording shot images, and is constituted by a semiconductor memory, a magnetic disk, and the like.

A connector 171 electrically connects the main-body of the image capturing apparatus 100 to the lens unit 180. The connector 171 exchanges a control signal, a status signal, a data signal, and the like between the main-body of the image capturing apparatus 100 and the lens unit 180, and also has a function of supplying currents at various voltages. Also, whether or not the lens unit 180 is mounted to the connector 171 is detected by a lens unmount/mount detection unit 154.

Next, the configuration of the lens unit 180 will be described. The imaging lens 181 is constituted by a plurality of lenses including a focus lens for performing focus adjustment by moving in an optical axis direction and a zoom lens for performing zooming. Also, an aperture 182 adjusts an amount of light to the image capturing device 122 of the main-body of the image capturing apparatus 100. A lens unit control unit 183 controls the entire lens unit 180 in accordance with control signals from the system control unit 150 of the main-body of the image capturing apparatus 100, and controls driving of the focus lens and the zoom lens of the imaging lens 181 and the aperture 182. Also, the lens unit control unit 183 includes a memory for storing constants and variables for operations, programs, and the like. Moreover, the lens unit control unit 183 also includes a nonvolatile memory for storing identification information such as a model name specific to the lens unit 180 and a production number thereof, management information, functional information such as a maximum aperture, a minimum aperture, a focal length, an amount of aberration such as distorted aberration, current and past setting values, and the like. A connector 184 electrically connects the lens unit 180 to the main-body of the image capturing apparatus 100. The connector 184 exchanges a control signal, a status signal, a data signal, and the like between the main-body of the image capturing apparatus 100 and the lens unit 180, and also has a function of receiving currents at various voltages.

Figure 2:
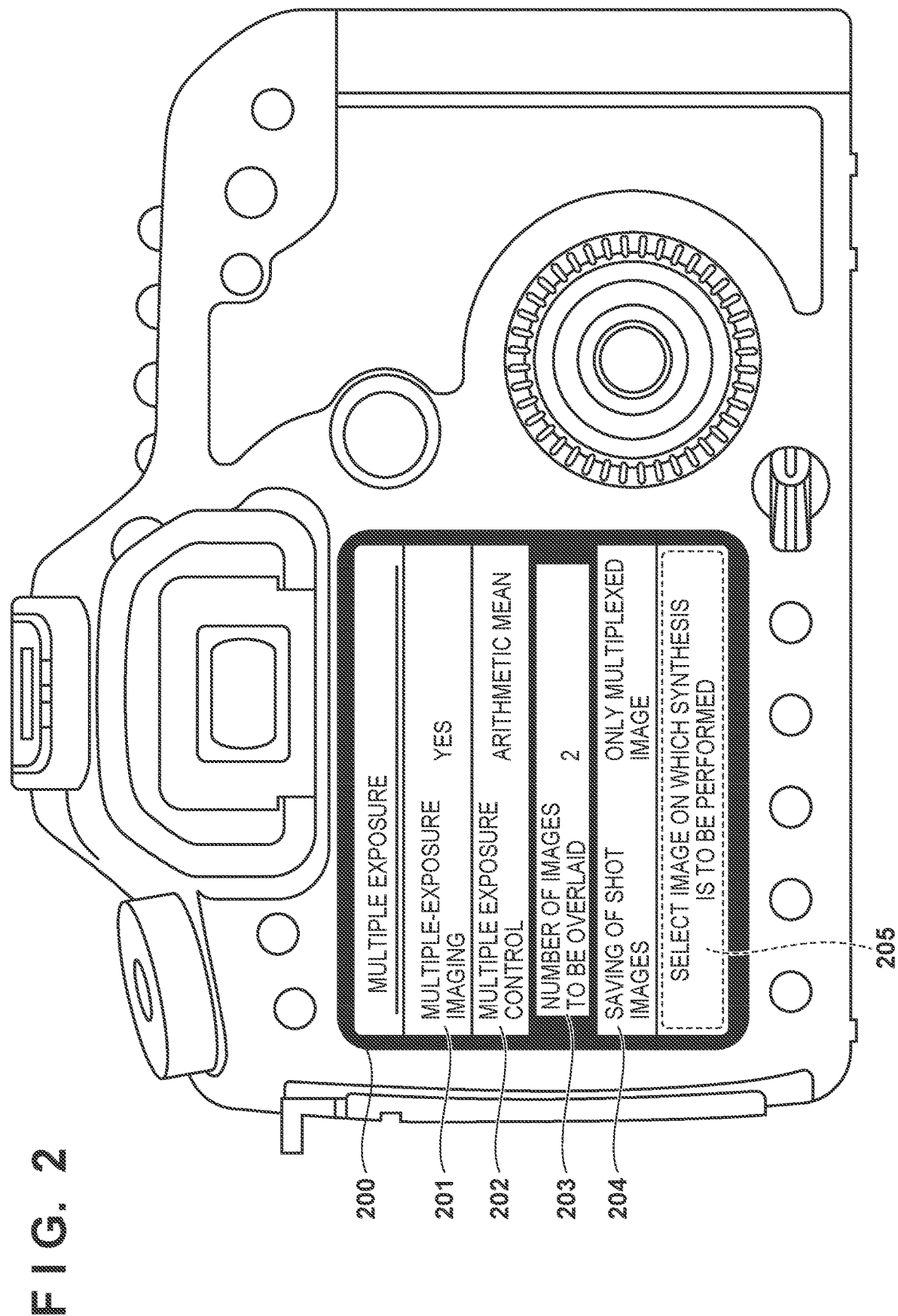
FIG. 2 is a diagram illustrating one example of a setting menu screen regarding multiple-exposure imaging.

Next, basic operations of the multiple-exposure imaging will be described using FIGS. 2 and 3. FIG. 2 is a setting menu screen for the multiple-exposure imaging, and FIG. 3 shows an image to be shot in the multiple-exposure imaging.

When a user presses down the menu button of the operation unit 170, a menu screen for various settings is displayed. When the user selects a setting item for the multiple-exposure imaging by operating the four-direction buttons of the operation unit 170, a sub-menu screen 200 for the multiple-exposure imaging shown in FIG. 2 is displayed in the display unit 128, and the user can change the setting for the multiple-exposure imaging.

The multiple-exposure imaging menu screen 200 includes setting items 201 to 204 and a button 205 for selecting a reference image. Among these items, the setting item 201 is a setting item for selecting whether or not the multiple-exposure imaging is to be performed, and one of "Yes" and "No" is selected. If the user exits this menu after selecting "Yes", and returns to shooting, the multiple-exposure imaging mode is entered.

The setting item 202 is a setting item for selecting the method of overlaying exposures when the multiple-exposure imaging is performed, and the user can select one of "addition", "arithmetic mean", "comparison (bright)", and "comparison (dark)". When "addition" is selected, the luminance of each of a plurality of images to be synthesized are simply added. When "arithmetic mean" is selected, the luminance of each of a plurality of images to be synthesized are added so as to obtain the luminance that is the average luminance of the images to be overlaid, which will be described later. When "comparison (bright)" is selected, overlaying is performed such that the luminance is compared between the images to be synthesized, and brighter portions are kept. When "comparison (dark)" is selected, overlaying is performed such that the luminance is compared between the images to be synthesized, and darker portions are kept.

The setting item 203 is a setting item for selecting the number of images to be synthesized when the multiple-exposure imaging is performed, and the user can designate the number of images to be overlaid. In the multiple-exposure imaging mode, once the set number of images are shot and a synthetic image is recorded, the mode is returned to a normal snap mode from the multiple-exposure imaging mode.

The setting item 204 is a setting item for selecting the image to be recorded to the recording medium 190 in the multiple-exposure imaging, and the user can select one of "all images" and "only multiplexed image". When "all images" is selected, both of the plurality of images based on which overlaying was performed, and the multiple-exposure synthetic image are recorded in the recording medium 190. When "only multiplexed image" is selected, only the multiple-exposure synthetic image is recorded in the recording medium 190, and the individual images based on which overlaying was performed are not recorded.

When the user presses the button 205, one image file that is already stored in the recording medium 190 is to be selected, and a multiple-exposure synthetic image is to be created and recorded. Note that, if the user sets "5" in the setting item 203, and selects one recorded image file (RAW image file) by pressing down the button 205, the multiple-exposure synthetic image is created using the image indicated by the selected image file as the first image, and the remaining four images that will be shot thereafter.

Note that the configuration may be such that two or more image files can be selected. In this case, if two image files are selected, for example, a multiple-exposure synthetic image may be created from the two images indicated by the selected two files and three images that will be shot thereafter.

Figure 3A:
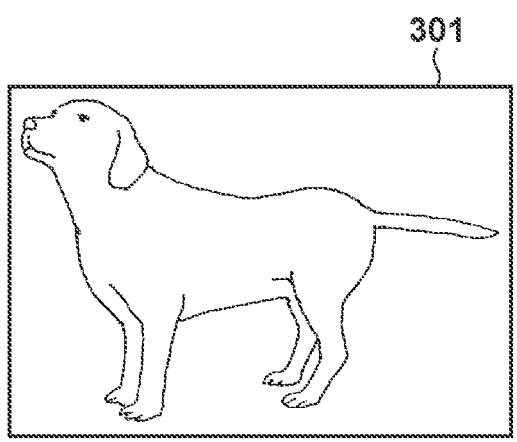
FIGS. 3A to 3C are diagrams illustrating one example of an image to be shot using multiple-exposure imaging.
Figure 3B:
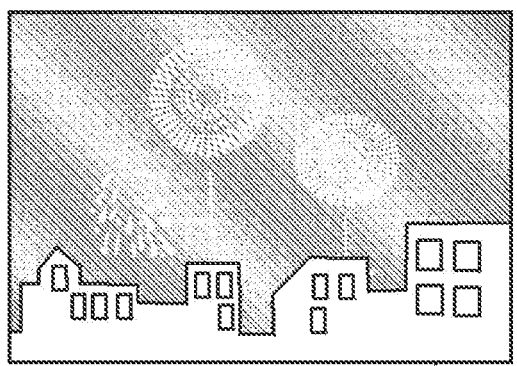
Figure 3C:
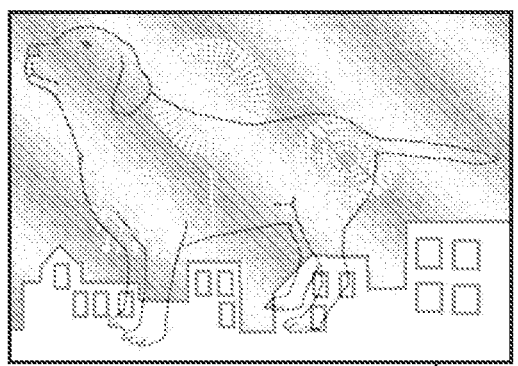

The reference sign 301 in FIG. 3A indicates a first shot image in the multiple-exposure imaging mode, and the reference sign 302 in FIG. 3B indicates a second shot image. Also, the reference sign 303 in FIG. 3C indicates a multiple-exposure synthetic image at the time when the second shooting is ended.

First Embodiment

Figure 4:
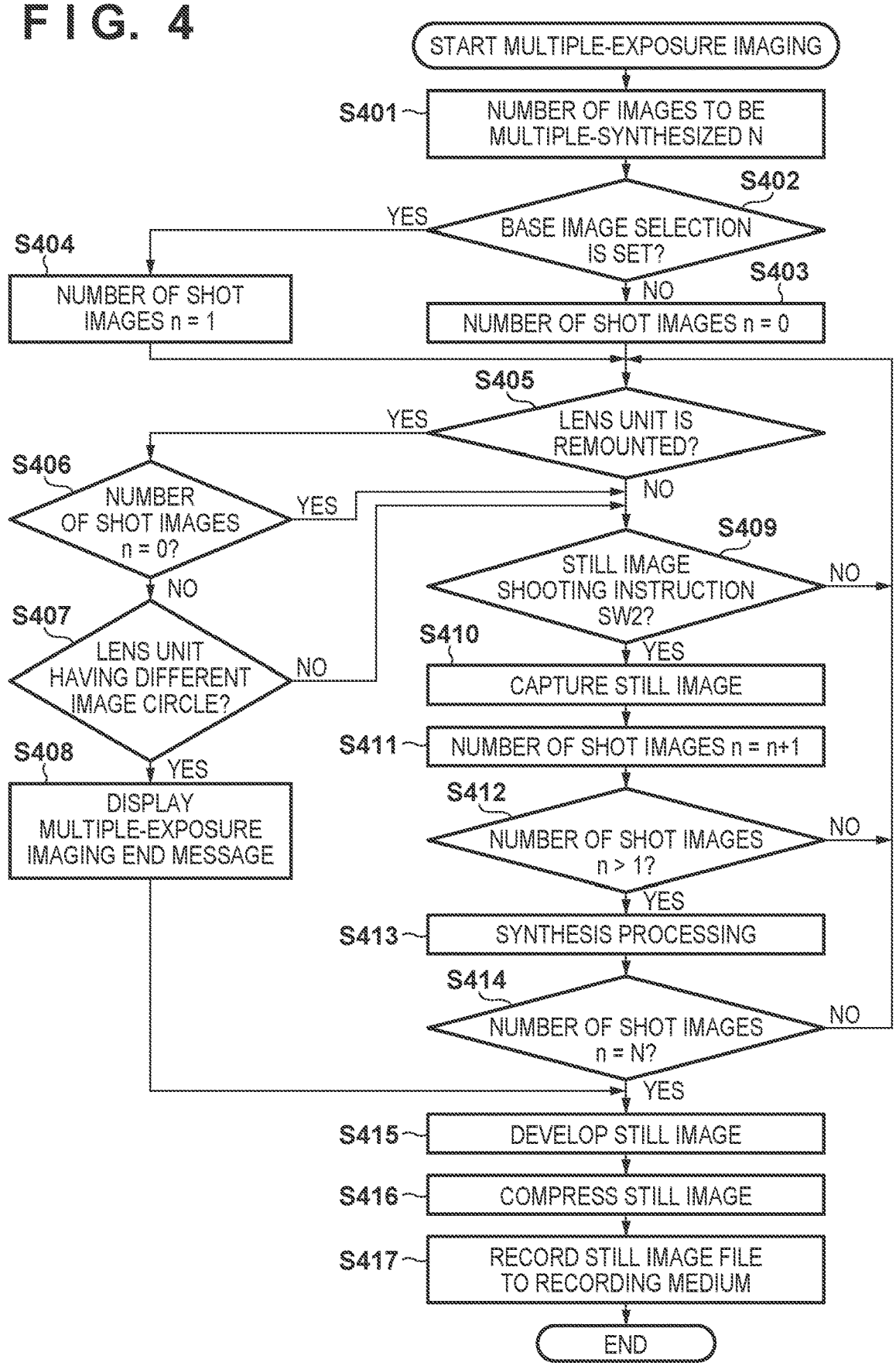
FIG. 4 is a flowchart illustrating operations of the image capturing apparatus according to the first embodiment.

FIG. 4 is a flowchart indicating the processing procedure of the system control unit 150 in the multiple-exposure imaging mode according to the first embodiment. The main-body of the image capturing apparatus 100 enters the multiple-exposure imaging mode when the user selects the multiple-exposure imaging mode using the mode switch 160 or selecting the multiple-exposure imaging in a menu setting, and the processing in FIG. 4 is executed. The processing in each step in FIG. 4 is realized by the system control unit 150 deploying a predetermined program read out from the nonvolatile memory 156 in the system memory 152, and controlling the operation and processing of each of the units that constitute the main-body of the image capturing apparatus 100. Note that it is assumed that various settings (such as the number of images to be synthesized and designation of an image file to be synthesized) have been already performed by the user, and the set information is stored in the system memory 152. Note that the configuration may be such that the number of images to be synthesized when the previous multiple-exposure imaging is performed is the number of images to be synthesized at this time unless specifically changed. In this case, the number of images to be synthesized may be stored in the nonvolatile memory 156.

In step S401, the system control unit 150 acquires the number of images to be multiple-synthesized N, which is one piece of setting information in the multiple-exposure imaging mode, from the system memory 152 or the nonvolatile memory 156. Next, in step S402, the system control unit 150 judges whether or not the base image selection has already been performed in which the base image is selected from already shot images as the first image based on information stored in the system memory 152 or the nonvolatile memory 156 in order to start the multiple-exposure imaging. If it is judged that the base image selection has not been performed (NO in step S402), the system control unit 150 advances the processing to step S403, and substitutes an initial value of "0" for a variable n for counting the number of shootings. On the other hand, if it is judged that the base image selection has been performed (YES in step S402), the system control unit 150 advances the processing to step S404, and substitutes an initial value of "1" for the variable n.

In step S405, the system control unit 150 judges whether or not remounting of the lens unit has been performed based on a signal from the lens unmount/mount detection unit 154. The remounting of the lens unit includes a case where the mounted lens unit is removed once and then mounted again, and a case where the mounted lens unit is replaced with a lens unit that is different from the lens unit that was mounted, for example.

If it is judged that the lens unit has been remounted (YES in step S405), the system control unit 150 advances the processing to step S406, and if it is judged that the lens unit has not been remounted (NO in step S405), the system control unit 150 advances the processing to step S409.

In step S406, the system control unit 150 judges whether or not the variable n is "0", that is, the base image is not selected and no image is shot after entering the multiple-exposure imaging mode. In other words, the system control unit 150 judges whether or not an image on which multiple synthesis is to be performed is present. If it is judged that the variable n is "0" (YES in step S406), the system control unit 150 advances the processing to step S409. Also, if the variable n is not "0" (NO in step S406), the system control unit 150 advances the processing to step S407.

In step S407, the system control unit 150 judges whether or not the image circle of the newly mounted lens unit is different from the image circle of the lens unit that was mounted.

Specifically, the system control unit 150 can communicate with the mounted lens unit 180 via the connector 171, and acquire identification information such as a model name. Also, the system control unit 150 can acquire the image circle of the mounted lens unit by searching a lens table 156a in the nonvolatile memory 156 using the acquired identification information. The system control unit 150 performs the judgement processing in step S407 by comparing the image circle of the lens unit prior to the lens unit being remounted (which is assumed to be stored in a predetermined address of the nonvolatile memory 156) and the image circle of the lens unit after being remounted.

Note that the judgement processing in step S407 may be performed based on whether or not the size of an image to be read out from the image capturing device 122 and to be recorded needs to be switched according to the mounted lens unit. Moreover, the judgement processing may be performed based on whether or not the amount of vignetting in the peripheral portion of an image read out from the image capturing device 122 that has been detected by scanning the image using the image processing unit 124 or the system control unit 150 is different from the previous amount of vignetting.

Figure 5A:
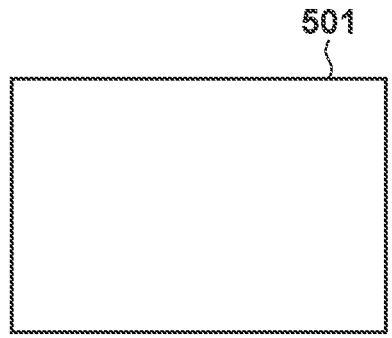
FIGS. 5A and 5B are diagrams illustrating a difference in image circle according to a lens unit.
Figure 5B:
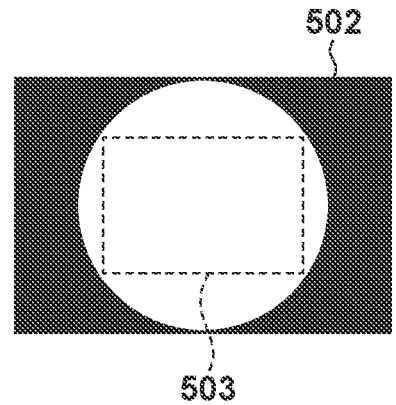

Here, the difference in the image circle will be described using FIGS. 5A and 5B. The reference signs 501 and 502 in FIGS. 5A and 5B show a manner in which light that has passed through the lens unit forms an image on an image sensor of the image capturing device 122. The reference sign 501 shows a case when a lens unit for a full-size sensor is attached, and the reference sign 502 shows a case when a lens unit for an APS-C size sensor is mounted. As described above, the image sensor in the present embodiment is a full-size sensor. However, when a lens unit for an APS-C size sensor is mounted, light is not incident on a peripheral portion of the image sensor, and "vignetting" occurs around the image. Therefore, when a lens unit for an APS-C size sensor is mounted, the system control unit 150 performs cropping processing in which an image of the region indicated by the reference sign 503, shown in the drawing, inside the image sensor is cropped out as a shot image by controlling the image capturing device 122. As a result of performing the cropping processing in this way, one image in which the vignetting portion is removed can be obtained, although the size of the image decreases.

On the other hand, in the case of the multiple-exposure imaging, since images are synthesized as shown in FIG. 3, when a lens unit whose image circle is different is mounted mid-multiple-exposure imaging, if the synthesis is performed as is, the vignetting portion is also synthesized, resulting in an unnatural synthetic image. Also, when the size of the read-out image is reduced to the APS-C sensor size, that is, a portion on which light is incident is cropped and read out, the size of the image differs and synthesis is not possible.

Therefore, in the present embodiment, if it is judged that the image circle of the remounted lens unit is the same as the image circle of the previously mounted lens unit (NO in step S407), the system control unit 150 advances the processing to step S409. Also, if it is judged that the image circle of the remounted lens unit is different from the image circle of the previously mounted lens unit (YES in step S407), the system control unit 150 advances the processing to step S408 in order to interrupt the image capturing processing thereafter.

Figure 6:
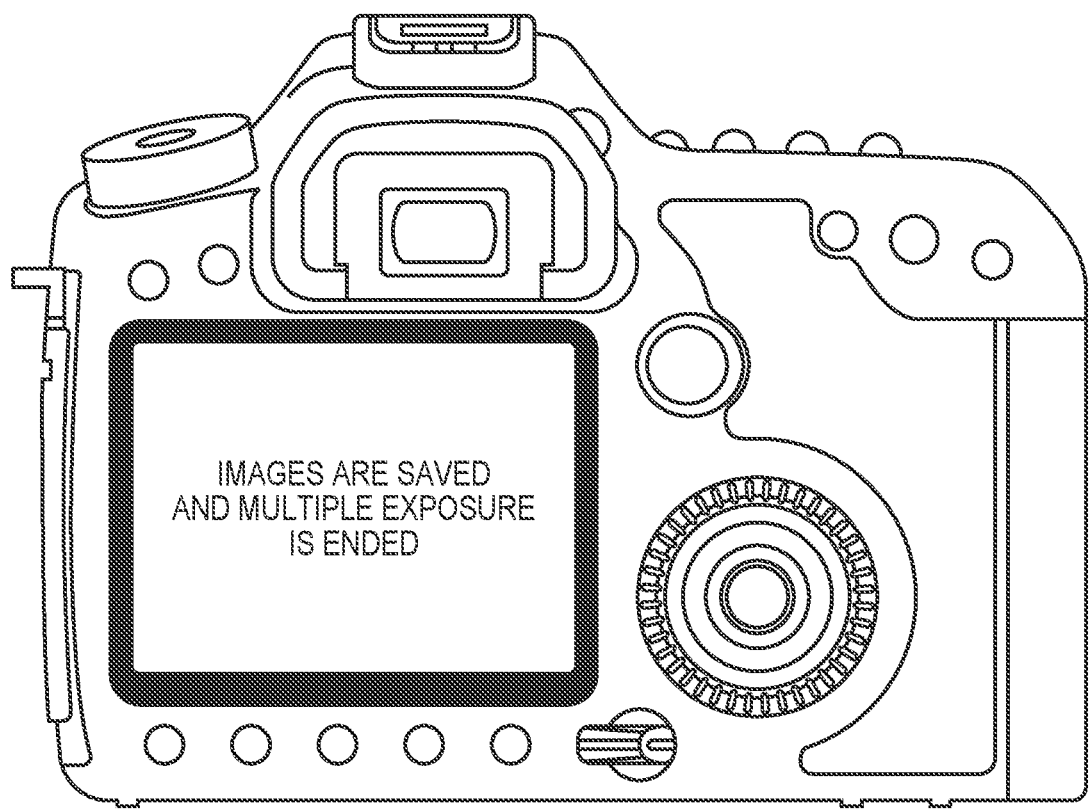
FIG. 6 is a diagram illustrating one example of a warning message according to the first embodiment.

In step S408, the system control unit 150 displays a message saying that the multiple-exposure imaging has ended (FIG. 6) in the display unit 28. Also, the system control unit 150 advances the processing to step S415 in order to record the synthetic image obtained by shooting that has been already performed to the recording medium 190 as an image file.

In step S409, the system control unit 150 judges whether or not the second shutter switch 163 is turned on (whether or not the second shutter switch signal SW2 is generated). If it is judged that the second shutter switch 163 is not turned on (NO in step S409), the system control unit 150 returns the processing to step S405, and waits for the second shutter switch 163 to be turned on. Then, if it is judged that the second shutter switch 163 is turned on, the system control unit 150 advances the processing to step S410.

In step S410, the system control unit 150 performs capturing in a still image frame using the image capturing device 122, stores the obtained image data (RAW image data in a Bayer arrangement) in the memory 132, and advances the processing to step S411. In step S411, the system control unit 150 increments the value of the variable n by "1", and advances the processing to step S412.

In step S412, the system control unit 150 judges whether or not the value of the variable n is larger than "1". That is, the system control unit 150 judges whether or not an image to be processed in the synthesis processing is already present. If it is judged that the variable n is "1" or less (NO in step S412), the system control unit 150 returns the processing to step S405. Also, if it is judged that the variable n is larger than "1" (YES in step S412), the system control unit 150 advances the processing to step S413.

In step S413, the system control unit 150, by controlling the image processing unit 24, synthesizes pieces of image data obtained by capturing an image in step S410 and stored in the memory 132, generates synthesized image data, and stores the synthesized image data in the memory 132. If the variable n is larger than "2", that is, if the image obtained by capturing in step S410 is the third or later image, the system control unit 150 synthesizes the image data obtained by capturing an image with the synthesized image data obtained in the previous synthesis processing, creates new synthesized image data, and stores the newly created synthesized image data in the memory 132. Upon ending the processing in step S413, the system control unit 150 advances the processing to step S414. Note that, in the synthesis processing in step S413, the synthesis processing is performed with the image data in the Bayer arrangement as is.

In step S414, the system control unit 150 judges whether or not the variable n is equal to "N", that is whether or not the multiple-exposure imaging is to be ended. If it is judged that the variable n is not equal to "N" (NO in step S414), the system control unit 150 returns the processing to step S405. Also, if it is judged that the variable n is equal to "N", the system control unit 150 advances the processing to step S415.

In step S415, the system control unit 150, by controlling the image processing unit 124, performs development processing (including debayering processing), that is, processing such as white balance adjustment and pixel interpolation, on the synthesized image data created in step S413, converts the obtained image data to YUV data, and writes the YUV data to the memory 132. Upon finishing the processing in step S415, the system control unit 150 advances the processing to step S416.

In step S416, the system control unit 150, controlling the image processing unit 24, compression-encodes the synthesized image data subjected to the development processing that was created in step S415 to still image data in the JPEG format, writes the still image data in the JPEG format to the memory 132, and advances the processing to step S417.

In step S417, the system control unit 150 records the still image data in the JPEG format that was compression-encoded in step S416 to the recording medium 190 via the memory medium I/F 118, and ends the series of multiple-exposure imaging. Note that, if "SAVING SHOT IMAGES" is selected in the setting item 204 in FIG. 2, the shot images that have been stored in the memory 132 and used in synthesis (images obtained in step S410) are also recorded in the recording medium 190.

As described above, when remounting of a new lens unit is detected while multiple-exposure imaging is being performed, and the image circle of the newly mounted lens unit is different from the image circle of the previously mounted lens unit, a message is displayed, and the multiple-exposure imaging is ended. Therefore, when a lens unit whose image circle is different from that of the previously mounted lens unit is mounted while performing multiple-exposure imaging, an inappropriate multiplexed image can be prevented from being synthesized. For example, when multiple-exposure imaging is started in a state in which a lens unit for a full-size sensor is mounted, and the lens unit is switched to a lens unit for an APS-C size sensor mid-multiple-exposure imaging, an inappropriate multiplexed image can be prevented from being synthesized. Also, a synthetic image using images that have been obtained by shooting before the lens unit was switched, although the number thereof is less than N that was initially set, can be stored in the recording medium 190.

Second Embodiment

Next, the processing of an image capturing apparatus according to a second embodiment will be described. The configuration of the image capturing apparatus according to the second embodiment is the same as that of the first embodiment (FIG. 1), and the detailed description thereof will be omitted.

In the first embodiment, when a new lens unit is mounted while multiple-exposure imaging is being performed, the lens characteristic acquired by the apparatus is the image circle of the lens, and if the image circle of the newly mounted lens unit is different from the image circle of the previously mounted lens unit, a message is displayed, and the multiple-exposure imaging is ended. In contrast, in the second embodiment, when a new lens unit is mounted while multiple-exposure imaging is being performed, and the image circle of the newly mounted lens unit is different from the image circle of the previously mounted lens unit, a warning message is displayed, and if a lens unit having the same image circle is mounted again, the shooting can be continued. In such a way, the apparatus controls creating the synthetic image in dependence on an acquired lens characteristic (in this case, an image circle). With this, even if a lens unit whose image circle is different from that of the previously mounted lens unit is mounted, inappropriate multiplexed images can be prevented from being synthesized. If a lens unit whose image circle is different from that of the previously mounted lens unit is erroneously mounted, the shooting is not ended, and the series of multiple-exposure imaging can be continued after an appropriate lens unit is remounted.

Figure 7:
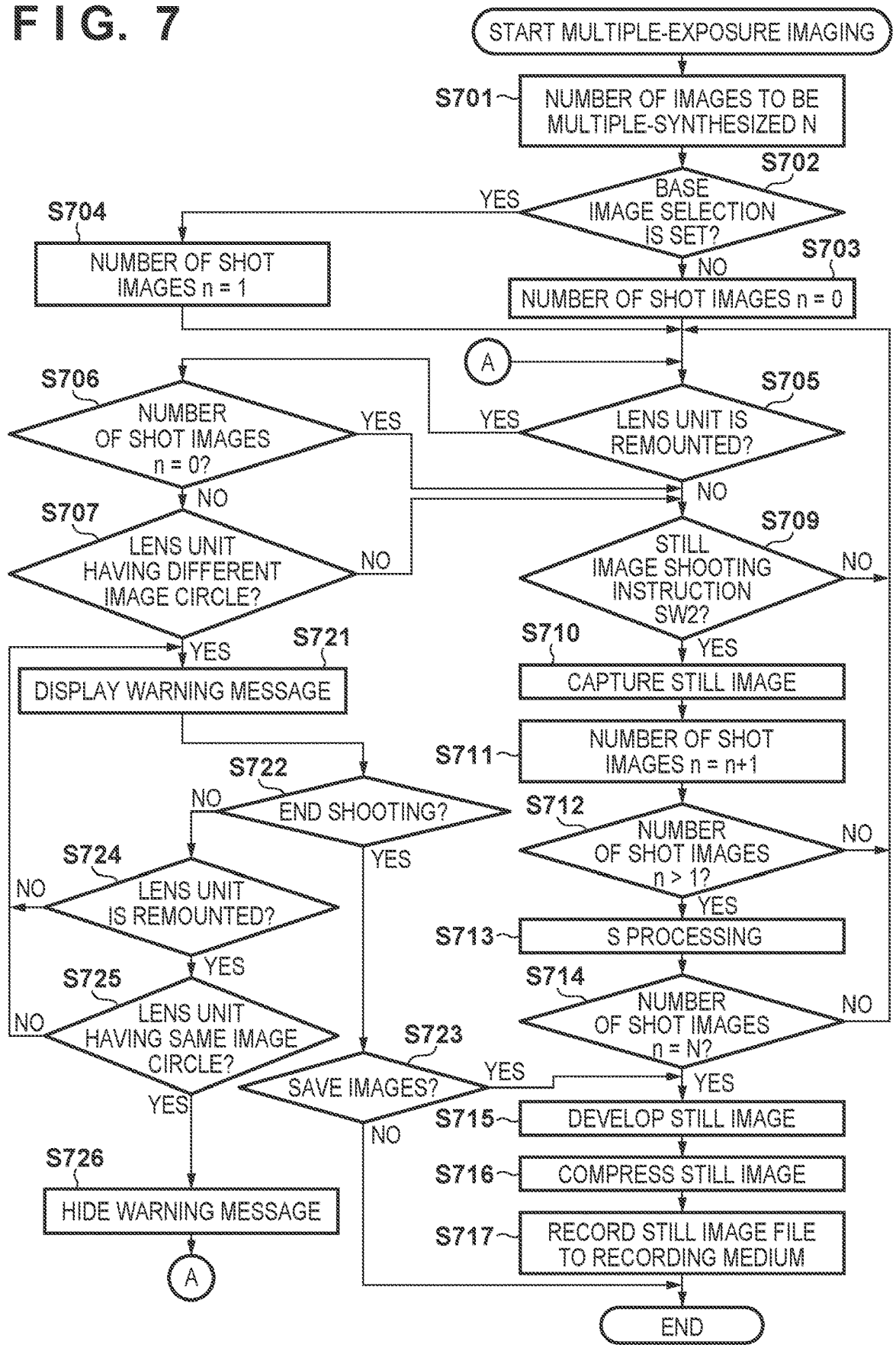
FIG. 7 is a flowchart illustrating operations of an image capturing apparatus in a second embodiment.

FIG. 7 is a flowchart indicating the processing procedure of the system control unit 150 according to the second embodiment in the multiple-exposure imaging mode. Note that it is assumed that various settings (such as the number of images to be synthesized and designation of an image file to be synthesized) regarding the multiple-exposure imaging have already been performed by a user, and the set information is stored in the system memory 152 or the nonvolatile memory 156.

The processing in steps S701 to S707 and steps S709 to S717 in FIG. 7 is the same as the processing in steps S401 to S407 and steps S409 to S417 in FIG. 4, and therefore the description thereof will be omitted. The processing in steps S721 to S726 in FIG. 7, which are steps after NO is judged in step S707 (corresponding to the steps after NO is judged in step S407 in FIG. 4), is different from the processing in FIG. 4.

Figure 8:
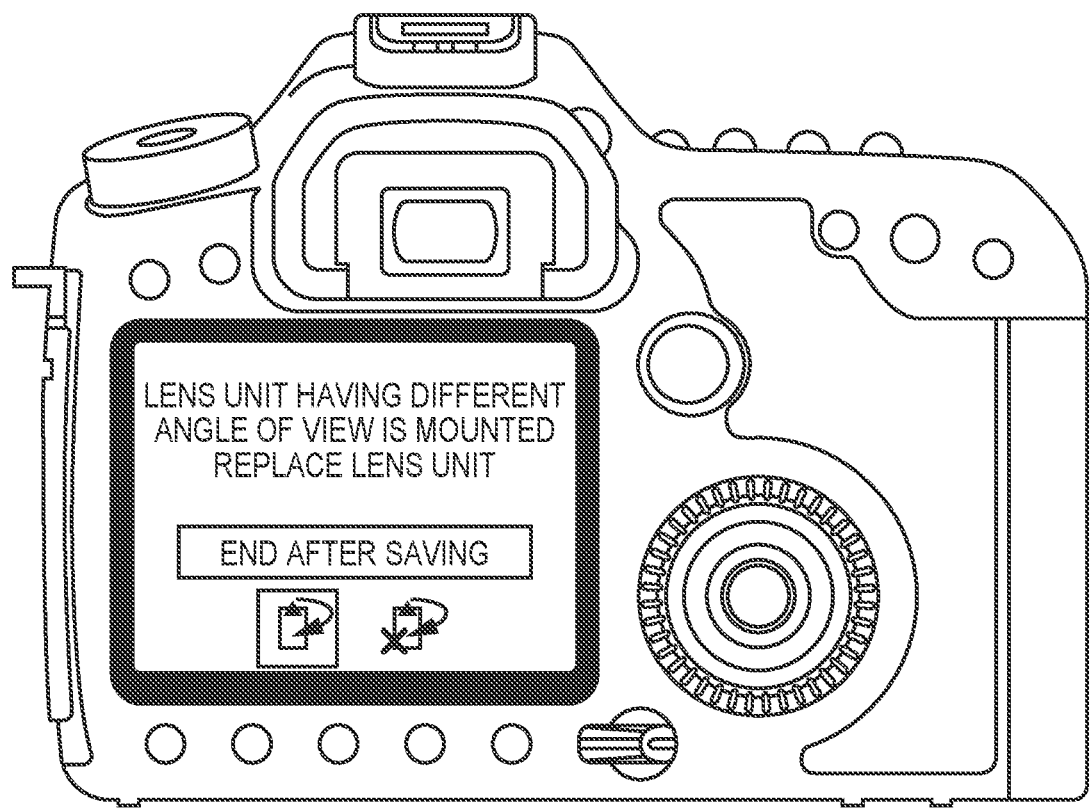
FIG. 8 is a diagram illustrating one example of a warning message in the second embodiment.

In step S721, the system control unit 150 displays a message (FIG. 8) for prompting a user to switch the lens unit again because the mounted lens unit has an image circle that is different from that of the previously mounted lens unit in the display unit 128. Also, the system control unit 150 displays, in the display unit 128, a menu with which the user can select whether or not the synthetic image obtained by the shooting performed before the remounting is to be recorded and the multiple-exposure imaging is to be ended, and whether or not the synthetic image is to be discarded and the multiple-exposure imaging is to be ended, and advances the processing to step S722.

In step S722, the system control unit 150 judges whether or not the user has selected the option to end the multiple-exposure imaging with the menu displayed in step S721. If it is judged that the user has not selected the option to end the multiple-exposure imaging (NO in step S722), the system control unit 150 advances the processing to step S724, and if it is judged that the user has selected the option to end the multiple-exposure imaging (YES in step S722), the system control unit 150 advances the processing to step S723.

In step S723, the system control unit 150 judges whether or not the user has selected the option to record the synthetic image obtained by the shooting performed before the remounting with the menu displayed in step S721. If it is judged that the user has not selected the option to record the synthetic image (NO in step S723), the system control unit 150 ends the series of multiple-exposure imaging. Also, if it is judged that the user has selected the option to record the synthetic image (YES in step S723), the system control unit 150 advances the processing to step S715.

In step S724, the system control unit 150 judges whether or not the lens unit has been remounted using the lens unmount/mount detection unit 154. If it is judged that the lens unit has been remounted (YES in step S724), the system control unit 150 advances the processing to step S725, and if it is judged that the lens unit has not been remounted (NO in step S724), the system control unit 150 returns the processing to step S721 to wait for remounting.

In step S725, the system control unit 150 judges whether or not the image circle of the lens unit that has been remounted is different from the image circle of the lens unit that was used in the immediately previous shooting. If it is judged that the image circle of the lens unit that has been remounted again is the same as the image circle of the lens unit that was used in the immediately previous shooting (YES in step S725), the system control unit 150 advances the processing to step S726. If it is judged that the image circle of the lens unit that has been remounted is different from the image circle of the lens unit that was used in the immediately previous shooting (NO in step S725), the system control unit 150 returns the processing to step S721.

In step S726, the system control unit 150 hides the warning message displayed in step S721, returns the processing to step S705, and continues the series of multiple-exposure imaging.

The processing of the series of multiple-exposure imaging from step S709 to step S717 is the same as the processing in steps S409 to S417 according to the first embodiment, and therefore the description thereof will be omitted.

According to the second embodiment as described above, when a lens unit whose image circle is different from that of the previously mounted lens unit is mounted while multiple-exposure imaging is performed, a warning message is displayed, and the series of multiple-exposure imaging can be ended according to the selection made by the user. Also, when the user has not selected the option to end the series of multiple-exposure imaging and remounted a lens unit having the same image circle, the series of multiple-exposure imaging can be continued. With this, when a lens unit whose image circle is different from that of the previously mounted lens unit is mounted, an inappropriate multiplexed image can be prevented from being synthesized, and if such a lens unit is erroneously mounted, the shooting is not ended, and the series of multiple-exposure imaging can be continued after another lens unit is mounted. For example, when multiple-exposure imaging is started in a state in which a lens unit for a full-size sensor is mounted, and the lens unit is switched to a lens unit for an APS-C size sensor mid-multiple-exposure imaging, an inappropriate multiplexed image can be prevented from being synthesized. Moreover, if a lens unit for a full-size sensor is remounted, the series of multiple-exposure imaging can be continued.

Third Embodiment

Next, the processing of an image capturing apparatus according to a third embodiment will be described. The configuration of the image capturing apparatus according to the third embodiment is the same as that of the first embodiment (FIG. 1), and the detailed description thereof will be omitted.

In the first embodiment, when a new lens unit is mounted while multiple-exposure imaging is being performed, if the image circle of the mounted lens unit is different form the image circle of the previously mounted lens unit, a message is displayed, and the multiple-exposure imaging is ended.

Similarly, in the third embodiment, when a new lens unit is mounted while multiple-exposure imaging is being performed, the apparatus acquires a lens characteristic of whether the lens unit necessitates predetermined image correction, and if a setting for image correction such as distortion correction is enabled with the newly mounted lens unit, that is, if a lens unit with which image correction must be performed is mounted, a message is displayed, and the multiple-exposure imaging is ended. In such a way, the apparatus controls creating the synthetic image in dependence on an acquired lens characteristic (in this case, an indication that the lens unit necessitates predetermined image correction). With this, if a lens unit with which image correction must be performed is mounted while multiple-exposure imaging is being performed, an unnatural multiplexed image can be prevented from being created as a result of synthesizing an image with respect to which image correction is unnecessary and an image with respect to which image correction needs to be performed.

Figure 9:
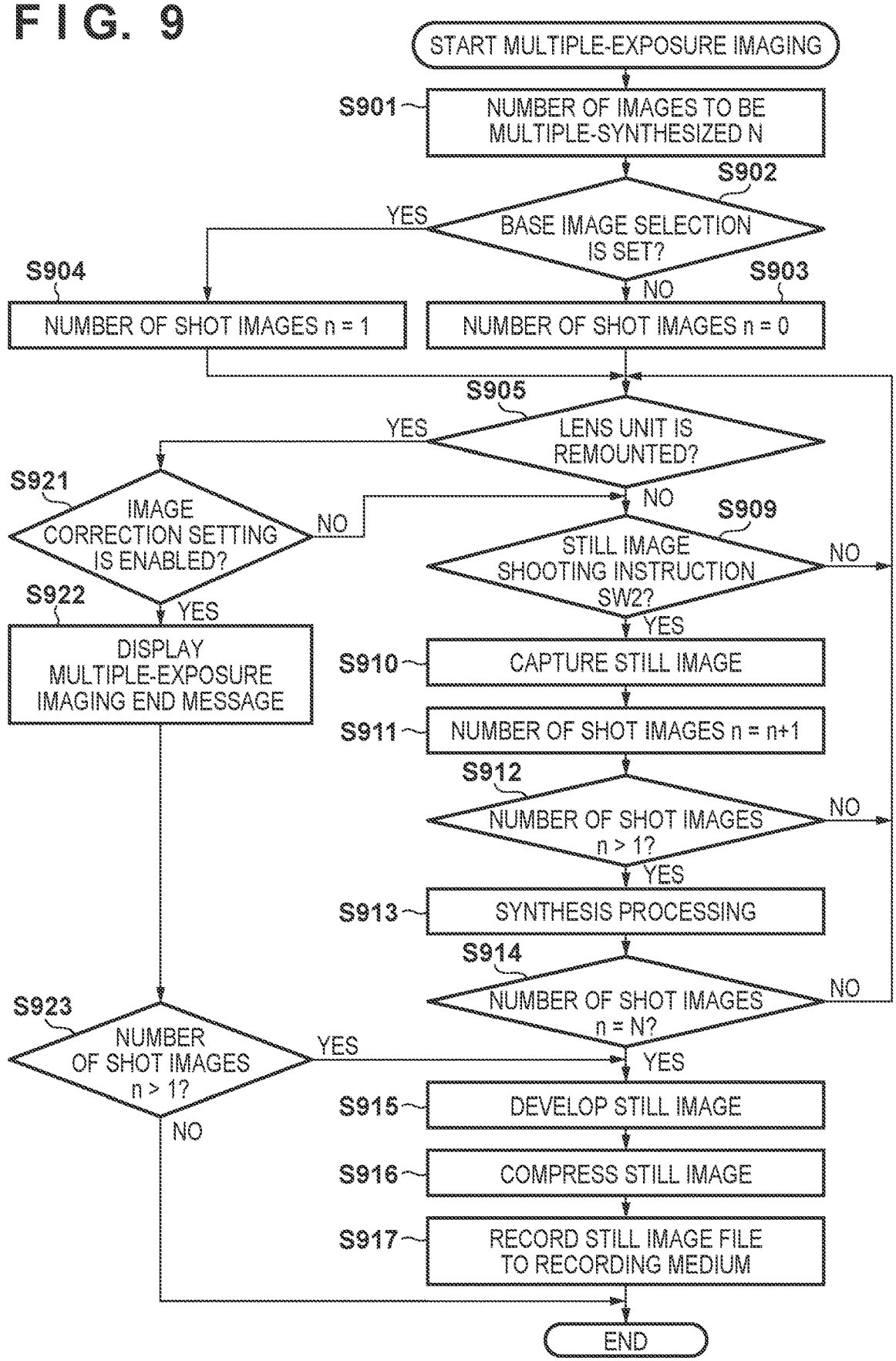
FIG. 9 is a flowchart illustrating operations of an image capturing apparatus in a third embodiment.

FIG. 9 is a flowchart illustrating the processing procedure of the system control unit 150 in a third embodiment in the multiple-exposure imaging mode. Note that it is assumed that various settings (such as the number of images to be synthesized and designation of an image file to be synthesized) regarding the multiple-exposure imaging have been already performed by a user, and the set information is stored in the system memory 152 or the nonvolatile memory 156. Also, when the multiple-exposure imaging mode is started, the setting of image correction such as distortion correction is fixed to be disabled, and the multiple-exposure imaging mode is started after the setting is configured as such.

The processing in steps S901 to S905 and steps from S909 to S917 in FIG. 9 is the same as the processing in steps S401 to S405 and steps S409 to S417 in FIG. 4, and therefore the description thereof will be omitted. The processing in steps S921 to S923 in FIG. 9, which are steps after NO is judged in step S905 (corresponding to the steps after NO is judged in step S405 in FIG. 4), is different from the processing in FIG. 4.

In step S921, the system control unit 150 judges whether or not the setting for image correction needs to be enabled with the newly mounted lens unit, that is, whether or not a lens unit with which image correction must be performed has been mounted. Whether or not the setting for image correction needs to be fixed to be enabled may be judged based on the lens table 156a in which information regarding whether or not correction is needed is stored in association with lens unit identification information (model name). The system control unit 150 may perform judgement by receiving identification information from the mounted lens unit via the connector 171 and acquiring information regarding whether or not correction needs to be performed with the lens unit from the lens table 156a. Also, depending on the situation, the system control unit 150 may perform judgement using information regarding correction function with respect to distorted aberration or the like of the lens unit 180 that has been acquired from the lens unit 180 via the connector 171. Moreover, the system control unit 150 may perform judgement by scanning an image read out from the image capturing device 122 by itself or using the image processing unit 124 and by detecting the amount of aberration of the image.

If it is judged that the setting for image correction need not to fix to be enabled with the newly mounted lens unit (NO in step S921), the system control unit 150 advances the processing to step S909. If it is judged that the setting for image correction needs to be enabled with the newly mounted lens unit (YES in step S921), the system control unit 150 advances the processing to step S922.

In step S922, the system control unit 150 displays a message saying that multiple-exposure imaging will be ended in the display unit 128, and advances the processing to step S923. In step S923, the system control unit 150 judges whether or not the value of the variable n is larger than "1", that is, whether or not at least two images have been shot for the multiple-exposure imaging. If the variable n is larger than "1" (YES in step S923), the system control unit 150 advances the processing to step S915. If it is judged that the variable n is "1" or less (NO in step S923), the system control unit 150 ends the series of multiple-exposure imaging.

The processing from still image shooting in step S909 to ending of the series of multiple-exposure imaging in step S917 is the same as the processing in steps S409 to S417 according to the first embodiment, and therefore the description thereof will be omitted.

According to the third embodiment as described above, when a new lens unit is mounted while multiple-exposure imaging is being performed, if the setting for image correction such as distortion correction is fixed to be enabled with the mounted lens unit, that is, if a lens unit with which image correction must be performed is mounted, a message is displayed and the multiple-exposure imaging is ended. Accordingly, a lens unit with which image correction must be performed is mounted during multiple-exposure imaging in which the setting for image correction is fixed to be disabled, an inappropriate multiplexed image is prevented from being synthesized. For example, if the lens unit is switched to a lens unit with which distorted aberration is large and the setting for image correction needs to be fixed to be enabled despite being low cost while multiple-exposure imaging is being performed, an inappropriate multiplexed image can be prevented from being synthesized.

Fourth Embodiment

Next, the processing of an image capturing apparatus according to a fourth embodiment will be described. The configuration of the image capturing apparatus according to the fourth embodiment is the same as that of the first embodiment (FIG. 1), and the detailed description thereof will be omitted.

In the third embodiment, when the setting for image correction such as distortion correction needs to be enabled with a lens unit that is newly mounted while multiple-exposure imaging is being performed, that is, when a lens unit with which image correction must be performed is mounted, a message is displayed and the multiple-exposure imaging is ended. In contrast, in the fourth embodiment, the apparatus acquires a lens characteristic of whether the lens unit necessitates predetermined image correction, and when a lens unit with which image correction must be performed is mounted while multiple-exposure imaging is being performed, a warning message is displayed, and if a lens unit with which image correction need not be performed is remounted, the shooting can be continued. In such a way, the apparatus controls creating the synthetic image in dependence on an acquired lens characteristic (in this case, an indication that the lens unit necessitates predetermined image correction). With this, when a lens unit with which image correction must be performed is mounted while multiple-exposure imaging in which the setting for image correction is disabled is performed, an unnatural multiplexed image can be prevented from being synthesized. Moreover, if such a lens unit is erroneously mounted, the shooting is not ended, and the series of multiple-exposure imaging can be continued after another lens unit is mounted.

Figure 10:
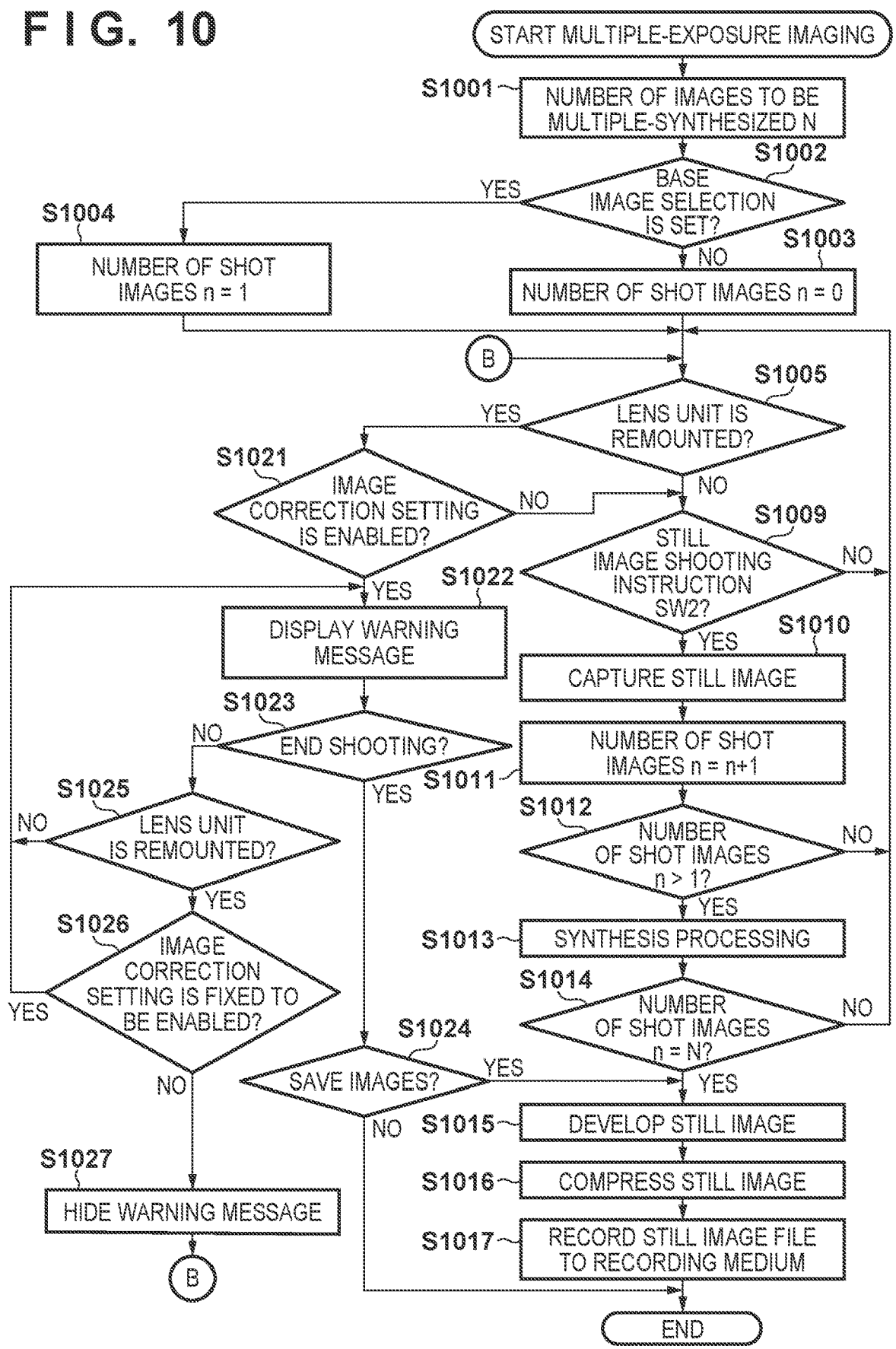
FIG. 10 is a flowchart illustrating operations of an image capturing apparatus in a fourth embodiment.

FIG. 10 is a flowchart illustrating the processing procedure of a system control unit 150 in the fourth embodiment in a multiple-exposure imaging mode. Note that it is assumed that various settings (such as the number of images to be synthesized and designation of an image file to be synthesized) regarding the multiple-exposure imaging have been already performed by a user, and the set information is stored in the system memory 152 or the nonvolatile memory 156. Also, when the multiple-exposure imaging mode is started, the setting of image correction such as distortion correction is fixed to be disabled, and the multiple-exposure imaging mode is started after the setting is configured as such.

The processing in steps S1001 to S1005 and steps S1009 to S1017 is the same as the processing in steps S401 to S405 and steps S409 to S417 in the first embodiment, and therefore the description thereof will be omitted.

In step S1021, the system control unit 150 judges whether or not a lens unit with which image correction must be performed has been mounted. If it is judged that a lens unit with which image correction need not be performed is mounted (NO in step S1021), the system control unit 150 advances the processing to step S1009. If it is judged that a lens unit with which image correction needs to be performed is mounted (YES in step S1021), the system control unit 150 advances the processing to step S1022. In step S1022, the system control unit 150 displays, in the display unit 128, a message for prompting a user to switch the lens unit again because a lens unit with which image correction must be performed has been mounted. Also, the system control unit 150 displays, in the display unit 128, a menu with which the user can select processing in which the synthetic image obtained by the shooting performed before the remounting is recorded and the multiple-exposure imaging is ended, or processing in which the synthetic image is discarded and the multiple-exposure imaging is ended, and advances the processing to step S1023.

In step S1023, the system control unit 150 judges whether or not the user has selected the option to end the multiple-exposure imaging on the menu displayed in step S1022. If it is judged that the user has not selected the option to end the multiple-exposure imaging (NO in step S1023), the system control unit 150 advances the processing to step S1025. Also, if it is judged that the user has selected the option to end the multiple-exposure imaging (YES in step S1023), the system control unit 150 advances the processing to step S1024.

In step S1024, the system control unit 150 judges whether or not the user has selected the option to record the synthetic image obtained by the shooting performed before the remounting with the menu displayed in step S1022. If it is judged that the user has not selected the option to record the synthetic image (NO in step S1024), the system control unit 150 ends the series of multiple-exposure imaging. Also, if it is judged that the user has selected the option to record the synthetic image (YES in step S1024), the system control unit 150 advances the processing to step S1015.

In step S1025, the system control unit 150 judges whether or not the lens unit has been remounted using the lens unmount/mount detection unit 154. If it is judged that the lens unit has been remounted (YES in step S1025), the system control unit 150 advances the processing to step S1026, and if it is judged that the lens unit has not been remounted (NO in step S1025), the system control unit 150 returns the processing to step S1022.

In step S1026, the system control unit 150 judges whether or not the setting for image correction needs to be enabled with the remounted lens unit, that is, whether or not a lens unit with which image correction must be performed has been mounted. If it is judged that the setting for image correction need not be enabled with the remounted lens unit (NO in step S1026), the system control unit 150 advances the processing to step S1027. If it is judged that the setting for image correction needs to be enabled with the remounted lens unit (YES in step S1026), the system control unit 150 returns the processing to step S1022.

In step S1027, the system control unit 150 hides the warning message displayed in step S1022, returns the processing to step S1005, and continues the series of multiple-exposure imaging.

The processing of the series of multiple-exposure imaging from step S1009 to step S1017 is the same as the processing in steps S409 to S417 according to the first embodiment, and therefore the description thereof will be omitted.

According to the fourth embodiment as described above, when the setting for image correction needs to be fixed to be enabled with the lens unit that has been mounted while multiple-exposure imaging is being performed, that is, a lens unit with which image correction must be performed has been mounted, a warning message is displayed, and the series of multiple-exposure imaging can be ended according to the selection made by the user. Also, when the user has not selected the option to end the series of multiple-exposure imaging and remounted a lens unit with which image correction need not be performed is remounted, the series of multiple-exposure imaging can be continued. With this, when a lens unit with which image correction must be performed is mounted while multiple-exposure imaging in which the setting for image correction is fixed to be disabled is being performed, an inappropriate multiplexed image can be prevented from being synthesized. Also, if such a lens unit is erroneously mounted, the shooting is not ended, and the series of multiple-exposure imaging can be continued after another lens unit is mounted.

Fifth Embodiment

Next, a multiple-exposure imaging mode in a fifth embodiment will be described.

First, the relationship between an image sensor mounted in the image capturing device 122 and an image circle of a mounted lens unit will be described with reference to FIGS. 11A and 11B.

Figure 11A:
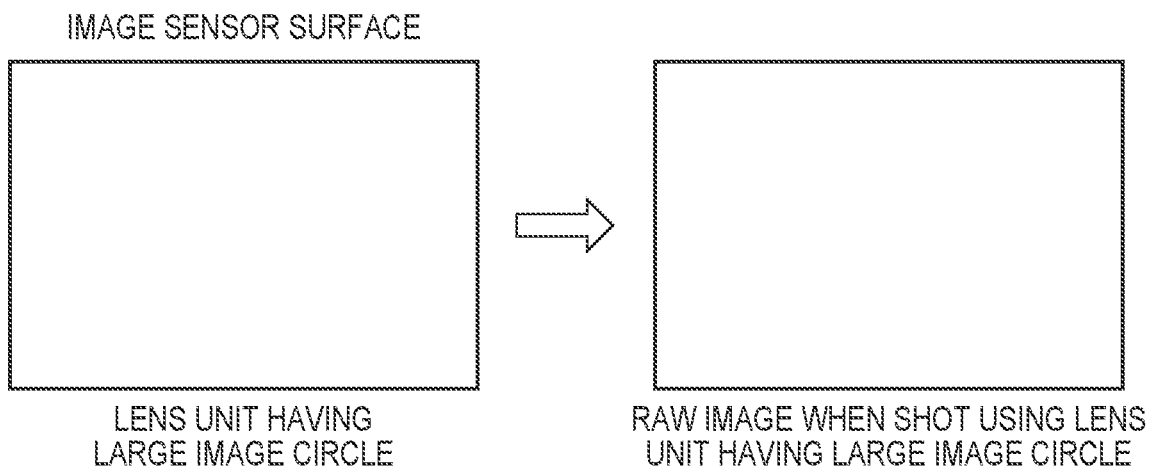
FIGS. 11A and 11B are diagrams illustrating a relationship between the image circle and the size of an obtained image.

As shown in FIG. 11A, if the image circle is larger than the image sensor surface (in the case of a full size lens unit), a captured image (RAW image data in a Bayer arrangement) using the entirety of the image sensor can be obtained.

Figure 11B:
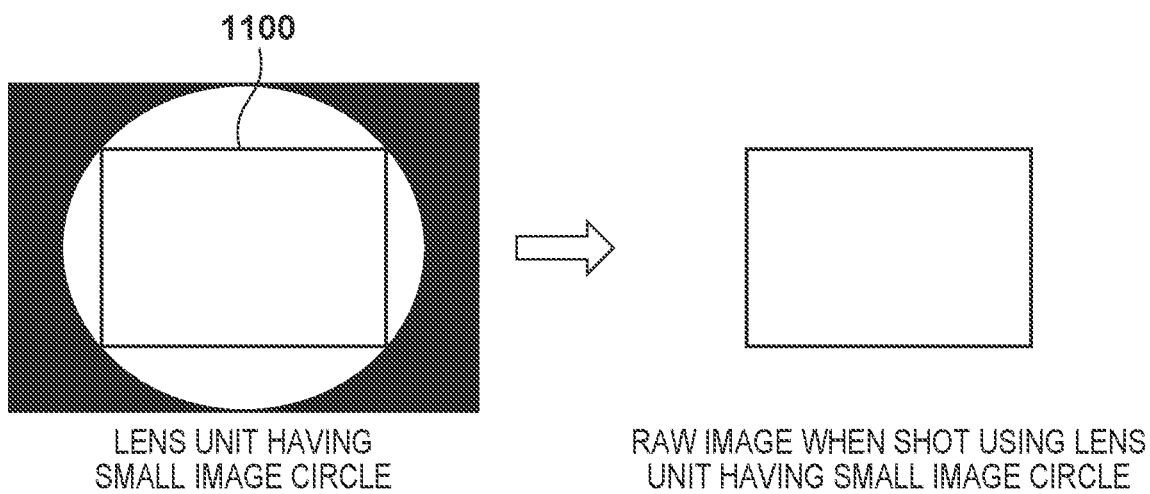

On the other hand, as shown in FIG. 11B, in the case of an APS-C lens unit, the size of the image circle is smaller than the size of the image sensor. Therefore, a rectangular range 1100 that is inscribed inside this image circle must be set as the image capturing range. That is, when the size of the image circle is smaller than the size of the image sensor, as shown in FIG. 11B, the size of the captured image needs to be reduced to be smaller than the size of the captured image shown in FIG. 11A.

The system control unit 150 receives identification information (such as model name) from a mounted lens unit 180 at a timing at which mounting of the lens unit 180 is detected based on a signal from the lens unmount/mount detection unit 154, or at a timing at which initialization processing after power-on is performed. Also, the system control unit 150 searches the lens table 156a using the received identification information as the key, and acquires the image circle of the mounted lens unit. Then, the system control unit 150 judges which of the states in FIGS. 11A and 11B is realized based on the acquired image circle. In the case of the state in FIG. 11A, the system control unit 150 sets the image processing unit 124 such that a captured image is acquired using the entire region of the image sensor. Also, in the case of the state in FIG. 11B, the system control unit 150 sets the image processing unit 124 such that an image inside the region 1100 inside the image sensor is acquired as the captured image.

Figure 12:
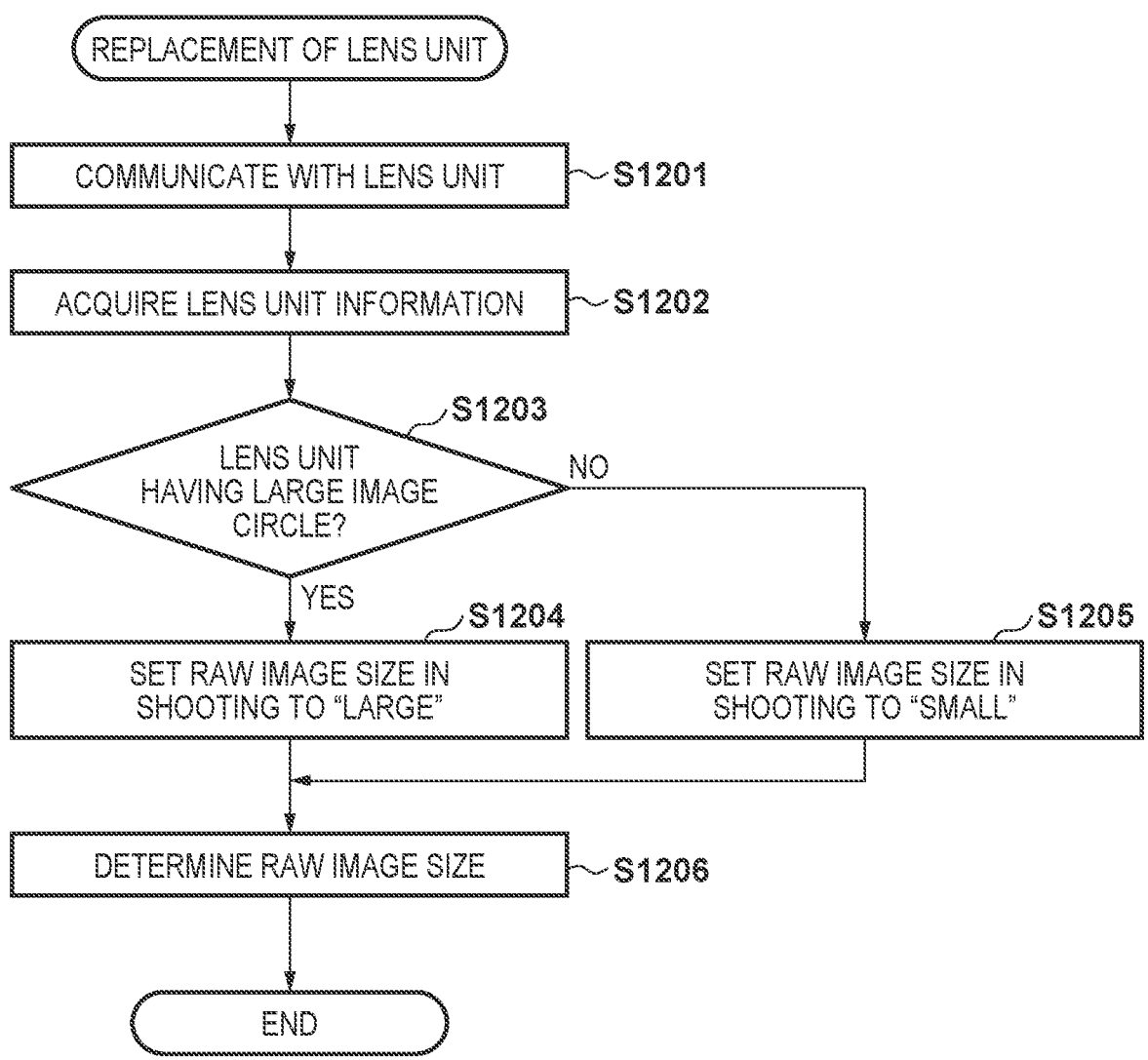
FIG. 12 is a flowchart illustrating processing when a lens unit is replaced in a fifth embodiment.

FIG. 12 is a flowchart illustrating processing of the system control unit 150 when a detection signal indicating that a lens unit has been mounted is received from the lens unmount/mount detection unit 154.

In step S1201, the system control unit 150 communicates with the lens unit control unit 183 via the connector 171. In step S1202, the system control unit 150 acquires identification information of the lens unit such as a model name. Also, in step S1203, the system control unit 150 acquires the image circle of the mounted lens unit by referring to the lens table 156a, and judges which of the image circle and the image sensor included in the image capturing device 122 is larger.

In step S1203, if it is judged that the image circle is larger than the image sensor, the system control unit 150 advances the processing to step S1204. In step S1204, system control unit 150 judges that the RAW image size in shooting is "large". On the other hand, if it is judged that the image circle is smaller than the size of the image sensor, the system control unit 150 advances the processing to step S1205. In step S1205, the system control unit 150 judges that the RAW image size in shooting is "small". Also, in step S1206, the system control unit 150 sets the size of the RAW image in a Bayer arrangement when acquiring the RAW image from the image capturing device 122 (either of the entire region of the image sensor or the region 1100 in the embodiment) to the image processing unit 124 based on the determined size.

Figure 13:
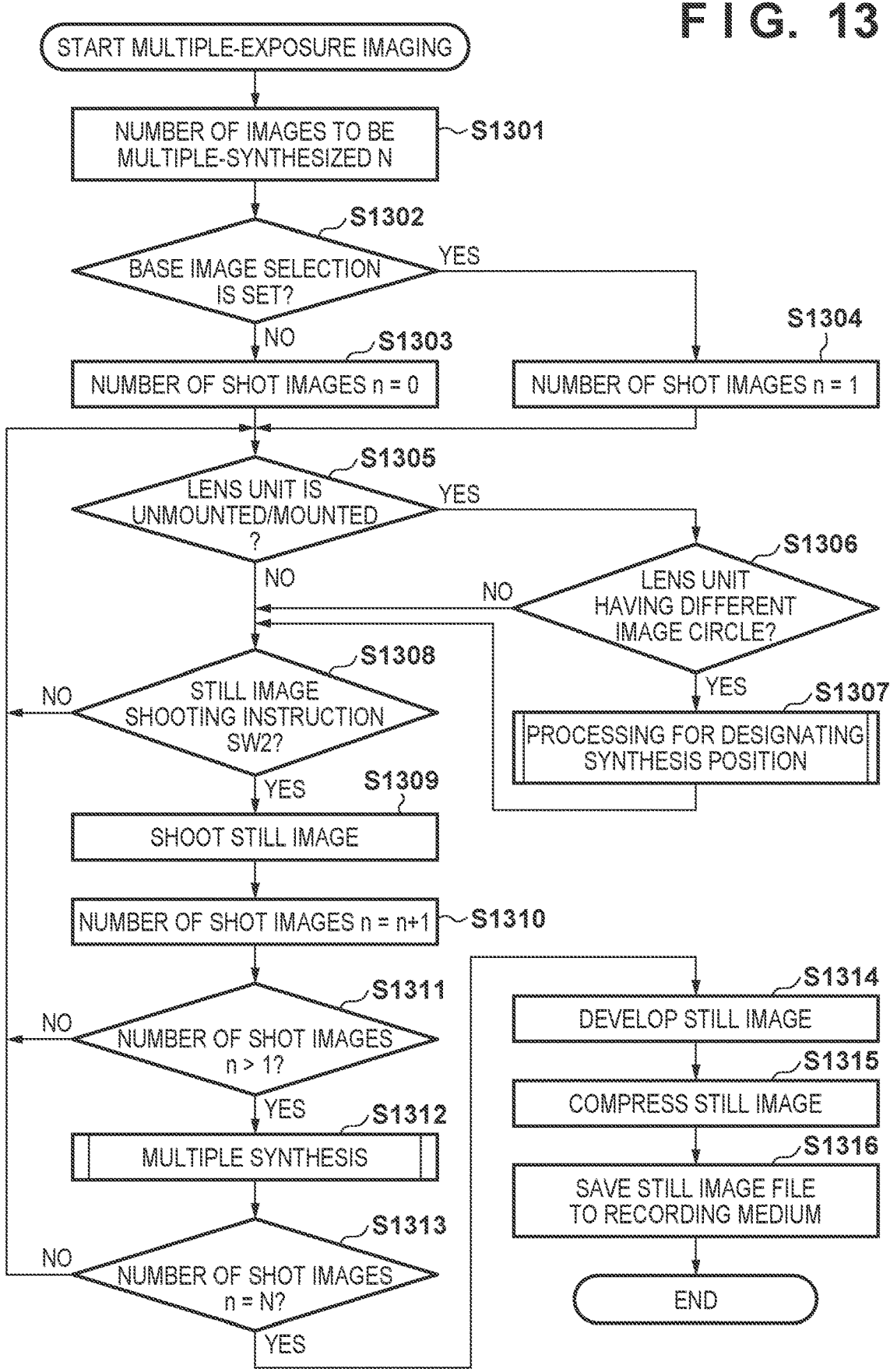
FIG. 13 is a flowchart illustrating processing when multiple-exposure shooting is performed in the fifth embodiment.

FIG. 13 is a flowchart illustrating the flow of multiple-synthesis processing in the image processing unit 124, which is the feature of the fifth embodiment. When a user selects a multiple-exposure imaging mode using the mode switch 160 or selects multiple-exposure imaging in the menu setting, the system control unit 150 enters the multiple-exposure imaging mode and performs the processing of the multiple-exposure imaging in accordance with the flowchart shown in FIG. 13. Note that the processing in each step in FIG. 13 is realized by the system control unit 150 deploying a predetermined program read out from the nonvolatile memory 156 in the system memory 152, executing the program, and controlling the operation and processing of the units that constitute the main-body of the image capturing apparatus 100. Note that it is assumed that various settings (such as the number of images to be synthesized and designation of an image file to be synthesized) have been already performed by the user, and the set information is stored in the system memory 152. Note that the configuration may be such that the number of images to be synthesized when the previous multiple-exposure imaging was performed is the number of images to be synthesized at this time unless specifically changed. In this case, the number of images to be synthesized may be stored in the nonvolatile memory 156.

In step S1301, the system control unit 150 acquires the number of images to be multiple-synthesized N in the multiple-exposure imaging mode from the system memory 152 or the nonvolatile memory 156. Next, in step S1302, the system control unit 150 judges whether or not the user has made a setting to use an image file recorded in the recording medium 190 as a first base image to be used in the multiple-exposure imaging. If it is judged that the base image has not been selected (NO in step S1302), the system control unit 150 advances the processing to step S1303, and if it is judged that the base image has been selected (YES in step S1302), the system control unit 150 advances the processing to step S1304.

In step S1303, the system control unit 150 initializes a variable n, which indicates the number of shot images, to "0", and advances the processing to step S1305. Also, in step S1304, the system control unit 150 initializes the variable n to "1", and advances the processing to step S1305.

In step S1305, the system control unit 150 judges whether or not a lens unit has been mounted anew (whether or not remounted) using the lens unmount/mount detection unit 154. The remounting of the lens unit includes a case where the mounted lens unit is removed once and then mounted again, and a case where the mounted lens unit is replaced with a lens unit that is different from the mounted lens unit, for example. If it is judged that a lens unit has been mounted anew (YES in step S1305), the system control unit 150 advances the processing to step S1306, and if it is judged that the lens unit is the same as that used when the previous shooting was performed, that is, unmounting/mounting has not been performed (NO in step S1305), the system control unit 150 advances the processing to step S1308.

In step S1306, the system control unit 150 judges whether or not the image circle of the currently mounted lens unit is different from the image circle of the lens unit that was used when the image data on which synthesis is to be performed was obtained.

Specifically, the system control unit 150 can communicate with the mounted lens unit 180 via the connector 171, and acquire identification information such as a model name. Also, the system control unit 150 can acquire the a lens characteristic such as an image circle of the mounted lens unit by searching a lens table 156a in the nonvolatile memory 156 using the acquired identification information. The system control unit 150 performs the judgement processing in step S1306 by comparing the image circle of the lens unit that was used when shooting was performed prior to the lens unit being remounted (which is assumed to be stored in a predetermined address of the nonvolatile memory 156) with the image circle of the lens unit after being remounted.

Note that, if the configuration is such that the size of an image to be read out from the image capturing device 122 and to be recorded is switched according to the mounted lens unit, the judgement processing may be performed based on the size of an image read out from the image capturing device 122. Also, the judgement processing may be performed by performing image processing on an image read out from the image capturing device 122 using the image processing unit 124 and by detecting the amount of vignetting in a peripheral portion of the image.

If it is judged that the image circle of the currently mounted lens unit is different from the image circle of the lens unit that was used when the image data on which synthesis is to be performed was obtained (YES in step S1306), the system control unit 150 advances the processing to step S1307, and if not (NO in step S1306), the system control unit 150 advances the processing to step S1308.

In step S1307, the system control unit 150 performs processing for designating a synthesis position (the details will be described later), and advances the processing to step S1308.

In step S1308, the system control unit 150 judges whether or not the second shutter switch 163 is turned on (whether or not the second shutter switch signal SW2 is generated). If it is judged that the second shutter switch 163 is not turned on (NO in step S1308), the system control unit 150 returns the processing to step S1305, and if it is judged that the second shutter switch 163 is turned on (YES in step S1308), the system control unit 150 advances the processing to step S1309.

In step S1309, the system control unit 150 acquires image data by causing the image capturing device 122 to perform capturing in a still image frame, and stores the image data to the memory 132. Also, in step S1310, the system control unit 150 increments the value of the variable n by "1". In step S1311, the system control unit 150 judges whether or not the value of variable n is larger than 1, that is, whether or not the captured image is a second or later image, and image data on which synthesis processing is to be performed is already present. If it is judged that the variable n is "1" or less (NO in step S1311), the system control unit 150 returns the processing to step S1305, and if it is judged that the variable n is larger than "1" (YES in step S1311), the system control unit 150 advances the processing to step S1312.

In step S1312, the system control unit 150, by controlling the image processing unit 124, creates new synthesized image data by synthesizing image data of interest that has been obtained by the capturing of an image in step S1309 and stored in the memory 132 and the image data on which synthesis is to be performed, and stores the new synthesized image data in the memory 132.

Here, if the value of the variable n is "2", the image of interest obtained in the latest step S1309 is the second image. Therefore, the system control unit 150 stores the synthetic image obtained by synthesizing the second image of interest and the first image to the memory 132. Also, if the value of the variable n is larger than "2", the image of interest is a third or later image. Therefore, in this case, the system control unit 150 creates a new synthetic image by synthesizing the image of interest obtained in the latest step S1309 and the previous synthetic image, and stores the new synthetic image to the memory 132.

In step S1313, the system control unit 150 compares the value of the variable n with "N". That is, the system control unit 150 judges whether or not the number of images in the multiple-exposure imaging reaches the set number. If it is judged that the value of the variable n is less than "N" (NO in step S1313), the system control unit 150 returns the processing to step S1305. Also, if it is judged that the value of the variable n is "N" (YES in step S1313), the system control unit 150 advances the processing to step S1314.

In step S1314, the system control unit 150, by controlling the image processing unit 124, performs development processing, that is, processing such as white balance adjustment and pixel interpolation, on the synthesized image data created in step S1312, converts the obtained image data to YUV data, and writes the YUV data to the memory 132. Also, in step S1315, the system control unit 150, by controlling the image processing unit 124, compression-encodes the synthesized image data subjected to the development processing that was created in step S1314 to still image data in the JPEG format, and writes the still image data in the JPEG format to the memory 132. Also, in step S1316, the system control unit 150 records the still image data in the JPEG format that was compression-encoded in step S1315 to the recording medium 190 via the memory medium I/F 118, and ends the series of multiple-exposure imaging.

Figure 19:
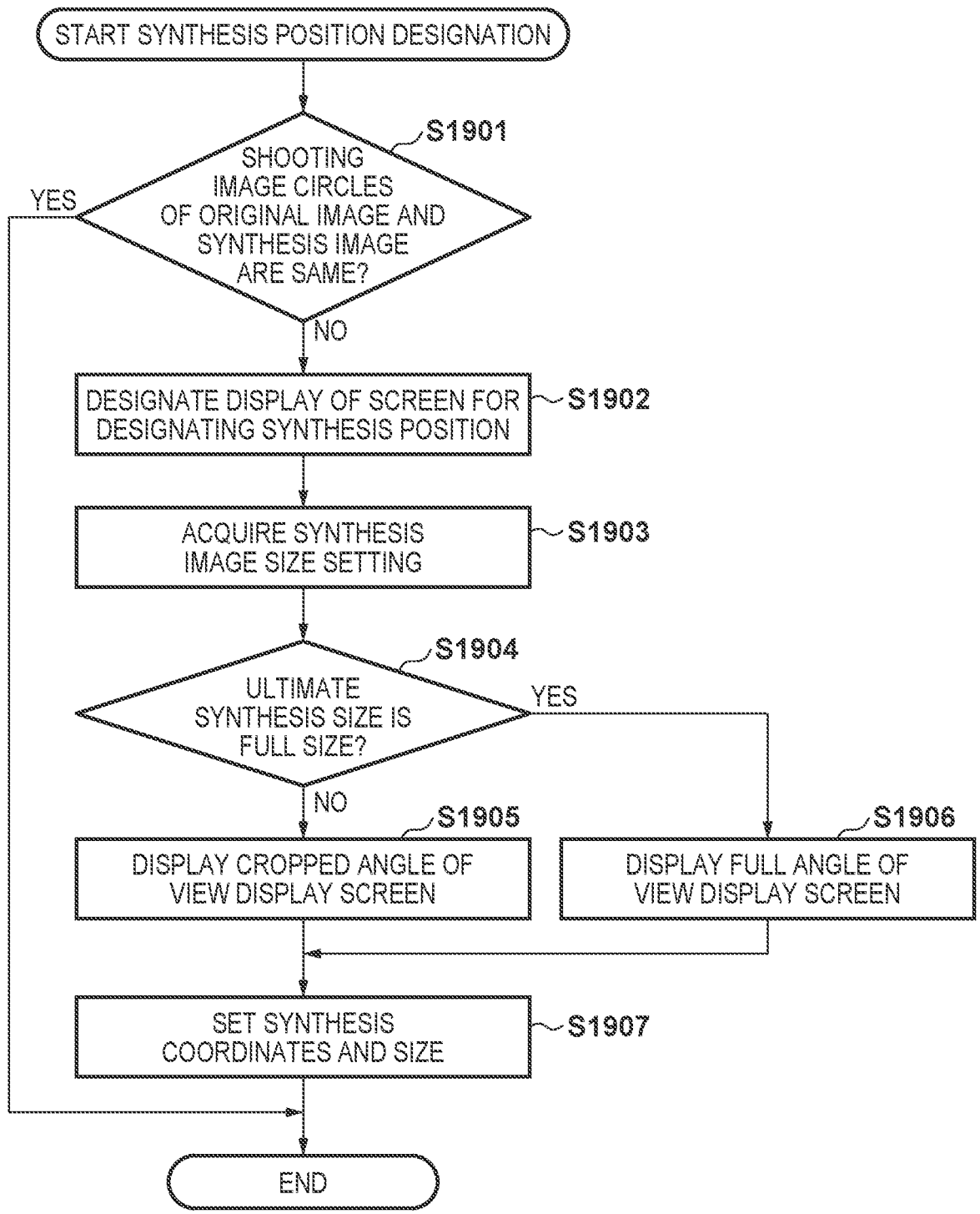
FIG. 19 is a flowchart illustrating processing for designating a synthesis position in the fifth embodiment.

Next, the processing for designating a synthesis position in step S1307 will be described with reference to FIG. 19.

In step S1901, the system control unit 150 judges whether the image circles when two images on which the synthesis processing is to be performed were shot are the same. If it is judged that the image circles are the same, or if the image data on which synthesis is to be performed and image data to be synthesized are not prepared (the number of shot images is less than 2), the system control unit 150 does not perform the processing for designating a synthesis position, and ends this processing. Also, if it is judged that the image circles when the two images on which the synthesis processing is to be performed were shot are not the same (NO in step S1901), the system control unit 150 advances the processing to step S1902.

In step S1902, the system control unit 150, by controlling the display unit 128, displays a screen for designating a synthesis position, and accepts a user operation via the operation unit 170.

In order to simplify the description, a case where the image circle of image data on which synthesis is to be performed (first image data, or synthesized image data obtained in the synthesis processing in the latest step S1312) is smaller than the image circle of the currently mounted lens unit will be described.

Figure 20A:
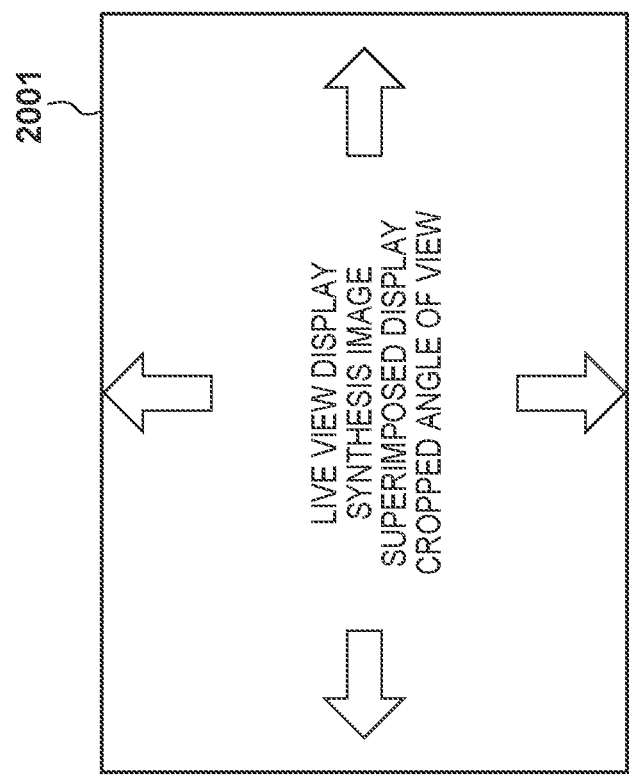
FIGS. 20A and 20B are diagrams illustrating an example of a GUI when designating a synthesis position in the fifth embodiment.

FIG. 20A shows an initial screen of the screen for designating a synthesis position in such a state. The system control unit 150 displays a live video obtained through the currently mounted lens unit, in the entire region of a region 2001 in the display unit 128. Then, the system control unit 150 displays an image on which synthesis is to be performed in a region 2002, which can be moved according to the user operation. When the user sees the screen, a synthetic image that has been obtained by the latest synthesis processing is movably displayed in an image of a live video. Also, the system control unit 150 moves the region 2002 inside the region 2001 according to the user operation made on the operation unit 170. Upon receiving an instruction from the user to determine the position via the operation unit 170, the system control unit 150 determines the position of the region 2002. That is, the system control unit 150 determines the position of the image on which synthesis is to be performed relative to the image to be synthesized.

Note that, if the image circle of the image on which synthesis is to be performed is larger than the image circle of the currently mounted lens unit, the system control unit 150 displays the image on which synthesis is to be performed in the entire region of the region 2001, and displays the live video in the region 2002. Then, the user performs designation of the position of the region 2002 and determination instruction, similarly to the operations described above. The different point for the user is that the position of the live video is to be determined instead of the image on which synthesis is to be performed.

In step S1903, the system control unit 150 prompts the user to select, as the final synthesis size, one of the size (full size) of an image of the image circle indicated by the region 2001 and the size of an image whose image circle is smaller, which is indicated by the region 2002. Then, the system control unit 150 waits for receiving the selection instruction from the user via the operation unit 170.

In step S1904, the system control unit 150 judges whether or not the final synthesis size selected by the user is the full size. If it is judged that the final synthesis size selected by the user is the full size (YES in step S1904), the system control unit 150 advances the processing to step S1906. On the other hand, if it is judged that the final synthesis size selected by the user is not the full size (NO in step S1904), the system control unit 150 advances the processing to step S1905.

In step S1905, the system control unit 150 keeps the display state of the display unit 128 to be the state shown in FIG. 20A in a period from now on until the second shutter switch 163 is turned on.

Figure 20B:
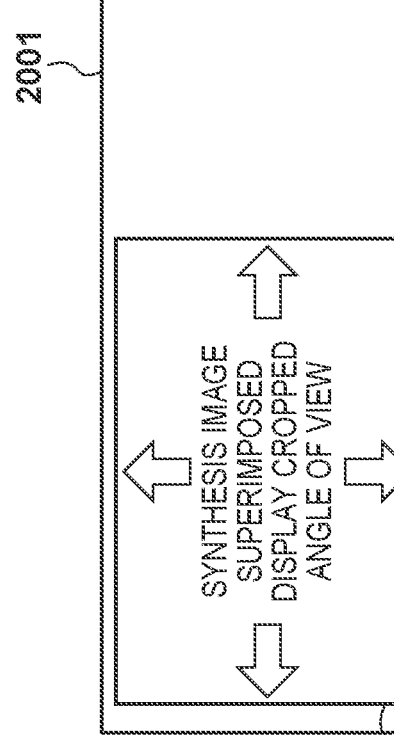

In step S1906, the system control unit 150 displays a live synthetic image of the region whose image circle is smaller in the entire region of the region 2001 of the display unit 128 in a period from now on until the second shutter switch 163 is turned on. That is, as shown in FIG. 20B, even if the currently mounted lens unit is a lens unit for a full size image sensor, the system control unit 150 displays, in the region 2001, a synthetic image obtained by cropping, similarly to the case of the smaller image circle. If stated simply, it is more understandable to consider that the image in the region 2002 in FIG. 20A is enlarged to the size of the entire region of the region 2001, and is displayed therein.

In step S1907, the system control unit 150 configures the setting of the image processing unit 124 such that synthesizing is performed, in the final synthesis size, using the information indicating the synthesis position determined as described above. As a result, the system control unit 150 causes the image processing unit 124 to perform synthesis processing under the setting described above in step S1312 in the flowchart shown in FIG. 13. Of course, the synthetic image obtained in step S1312 is one of a full-size image and an APS-C size image.

Next, examples of processing for synthesizing four images through the processing for designating a synthesis position in step S1307, which is performed by the image processing unit 124, will be described with reference to FIGS. 14 to 17.

Figure 14:
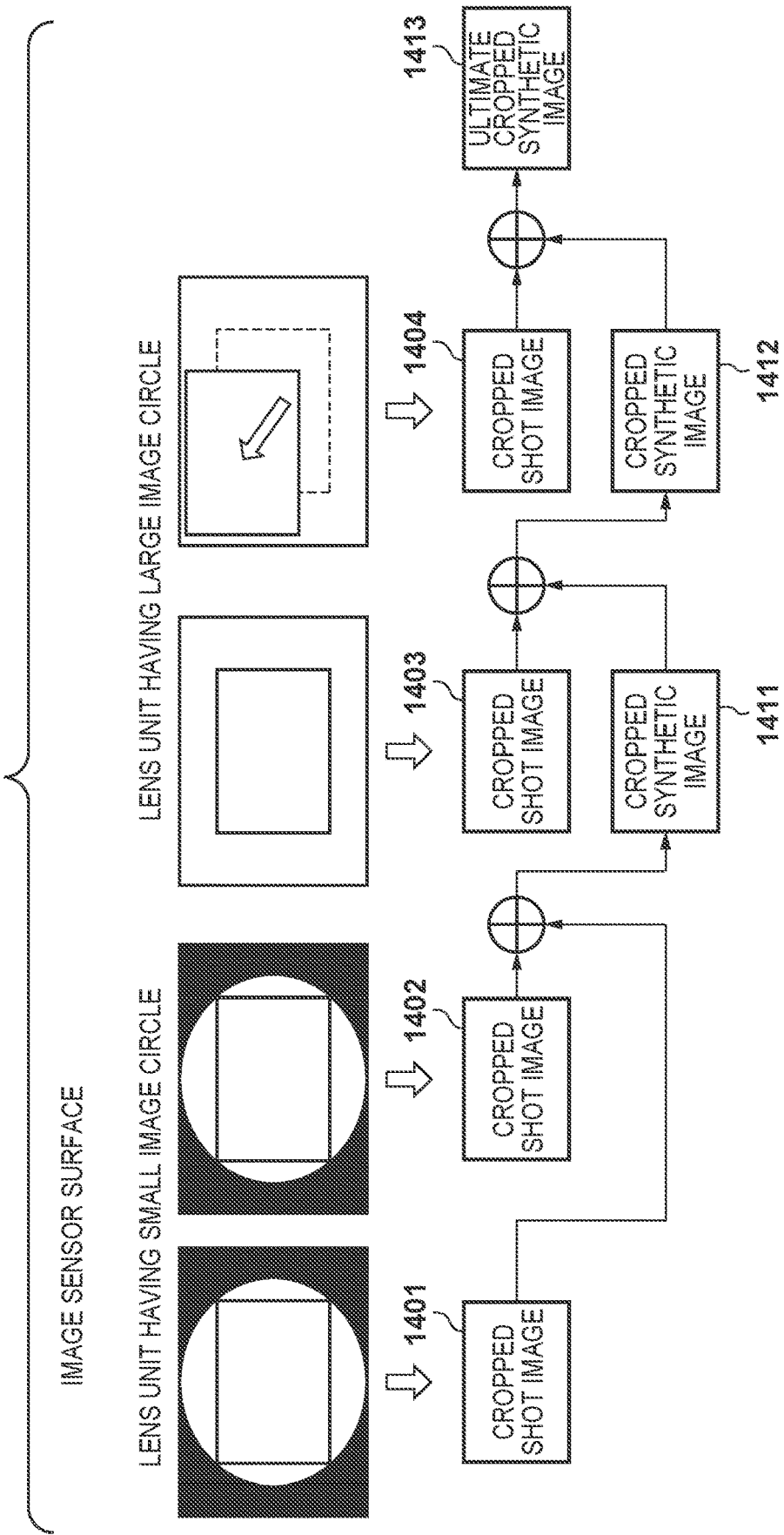
FIG. 14 is a diagram illustrating one example of a synthesizing sequence of image synthesis processing in the fifth embodiment.

FIG. 14 shows an example in which first and second images are captured using a lens unit whose image circle is small (APS lens unit), third and fourth images are captured using a lens unit whose image circle is large (full-size lens unit), and the size of the ultimate synthetic image designated by the user is a size of an image whose image circle is small.

The image processing unit 124 obtains images 1401 and 1402 by cropping regions corresponding to the APS image circle from the full-size images, when capturing the first and second images. Because the images 1401 and 1402 are images (cropped images) that have been shot using a lens unit having a small image circle, designation of the synthesis position by the user is not performed. The image processing unit 124 creates a synthetic image 1411 (cropped image) by simply synthesizing these two images 1401 and 1402. The third image was shot using a lens unit having a large image circle, and the user has selected a smaller image size as the size of the ultimate synthetic image. Therefore, the image processing unit 124 acquires an image obtained by cropping the full-size image as a third image 1403. Then, the image processing unit 124 creates a new synthetic image 1412 (cropped image) by synthesizing the synthetic image 1411 and the image 1403. Note that, here, the position of the image 1403 to be cropped from the full-size image obtained in the third capturing is designated by the user. Also, the fourth image was shot using the lens unit having a large image circle, and the user has selected a smaller image size as the size of the ultimate synthetic image. Therefore, the image processing unit 124 acquires an image obtained by cropping the full-size image as a fourth image 1404. Then, the image processing unit 124 creates an ultimate synthetic image 1413 (cropped image) by synthesizing the synthetic image 1412 and the image 1404. Note that, here, the position of the image 1404 to be cropped from the full-size image obtained in the fourth capturing is also designated by the user.

Figure 15:
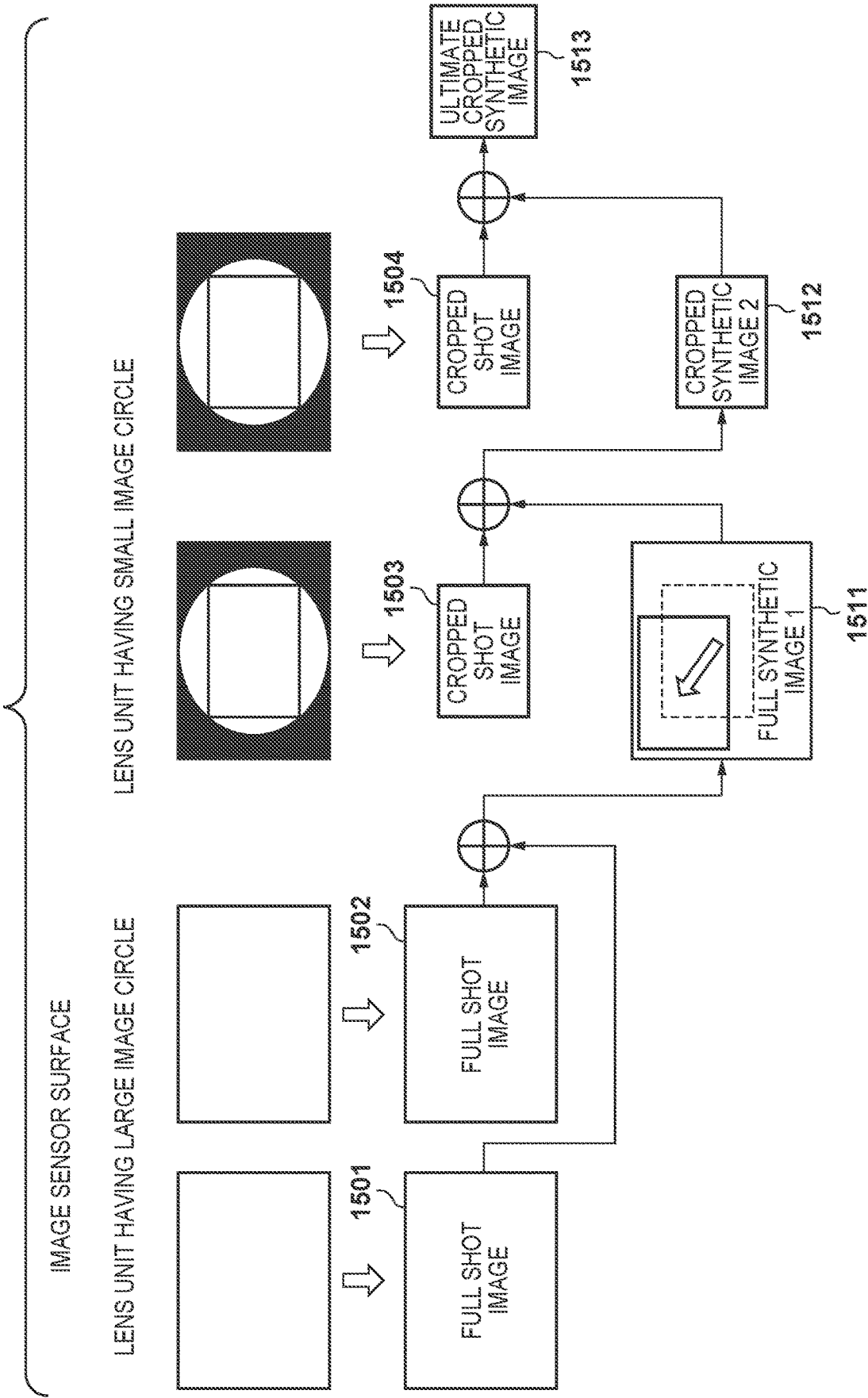
FIG. 15 is a diagram illustrating one example of a synthesizing sequence of image synthesis processing in the fifth embodiment.

FIG. 15 shows an example in which first and second images are captured using a lens unit whose image circle is large (full-size lens unit), third and fourth images are captured using a lens unit whose image circle is small (APS lens unit), and the size of the ultimate synthetic image designated by the user is the size of an image whose image circle is small.

Since images 1501 and 1502 are pieces of full-size image data obtained by performing capturing using the lens unit having a large image circle, designation of the synthesis position by the user is not performed when synthesizing these images. The image processing unit 124 creates a synthetic image 1511 (full-size image) by simply synthesizing these two images 1501 and 1502. Since the third image is captured by using a lens unit having a small image circle, the image processing unit 124 creates an image 1503 by cropping the full-size image obtained by the image capturing device 122. The user has selected a smaller image size as the size of the ultimate synthetic image. Therefore, the image processing unit 124 creates a synthetic image 1512 (cropped image) by synthesizing the synthetic image 1511 (full-size image) and the image 1503 (cropped image). Note that the synthesis position of the image 1503 on the synthetic image 1512 is designated by the user. Also, since the fourth image is captured by using a lens unit having a small image circle, the image processing unit 124 creates an image 1504 by cropping the full-size image obtained by the image capturing device 122. The user has selected a smaller image size as the size of the ultimate synthetic image. Therefore, the image processing unit 124 creates an ultimate synthetic image 1513 (cropped image) by synthesizing the synthetic image 1512 (cropped image) and the fourth image 1504 (cropped image). Note that, since the synthetic image 1512 and the image 1504 are cropped images, position designation by the user is not performed.

Figure 16:
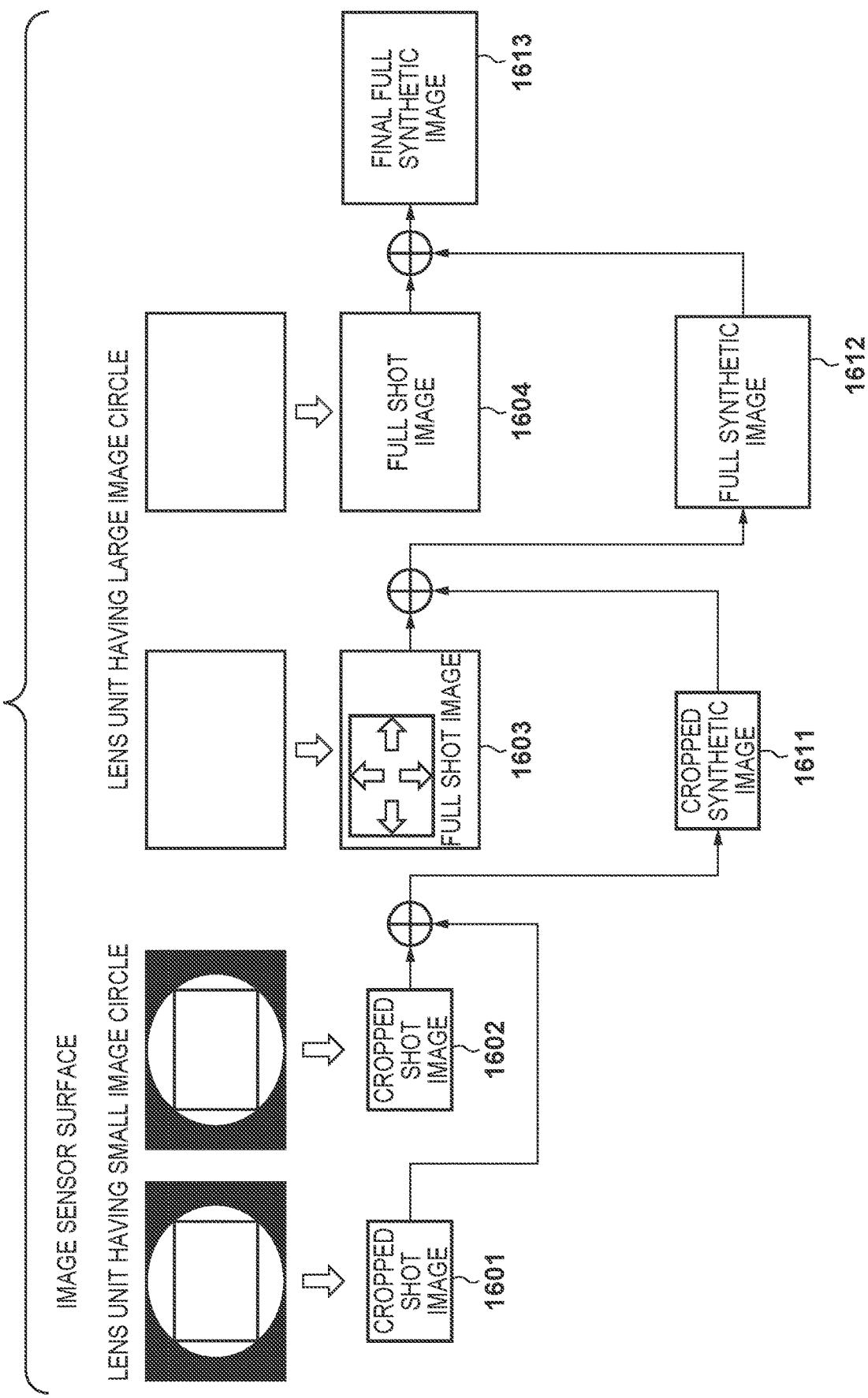
FIG. 16 is a diagram illustrating one example of a synthesizing sequence of image synthesis processing in the fifth embodiment.

FIG. 16 shows an example in which first and second images are captured using a lens unit whose image circle is small (APS lens unit), third and fourth images are captured using a lens unit whose image circle is large (full-size lens unit), and the size of the ultimate synthetic image designated by the user is the size of an image whose image circle is large.

The image processing unit 124 obtains images 1601 and 1602 by cropping regions corresponding to the APS image circle from the full-size images, when capturing the first and second images. Because the images 1601 and 1602 are images (cropped images) that have been shot using a lens unit having a small image circle, designation of the synthesis position by the user is not performed. The image processing unit 124 creates a synthetic image 1611 (cropped image) by simply synthesizing these two images 1601 and 1602. The third image was shot using a lens unit having a large image circle, and the user has selected a larger image size as the size of the ultimate synthetic image. Therefore, the image processing unit 124 obtains a full-size synthetic image 1612 by synthesizing the synthetic image 1611 (cropped image) and the full-size image 1603. Note that, here, the synthesis position of the synthetic image 1611 on the full-size image 1603 obtained in the third capturing is designated by the user. The fourth image was shot using a lens unit having a large image circle, and the user has selected a larger image size as the size of the ultimate synthetic image. Therefore, the image processing unit 124 creates an ultimate synthetic image 1613 (full-size image) by synthesizing the full-size synthetic image 1612 and the fourth full-size image 1604. Note that, since the synthetic image 1612 and the image 1604 are full-size images, position designation by the user is not performed.

Figure 17:
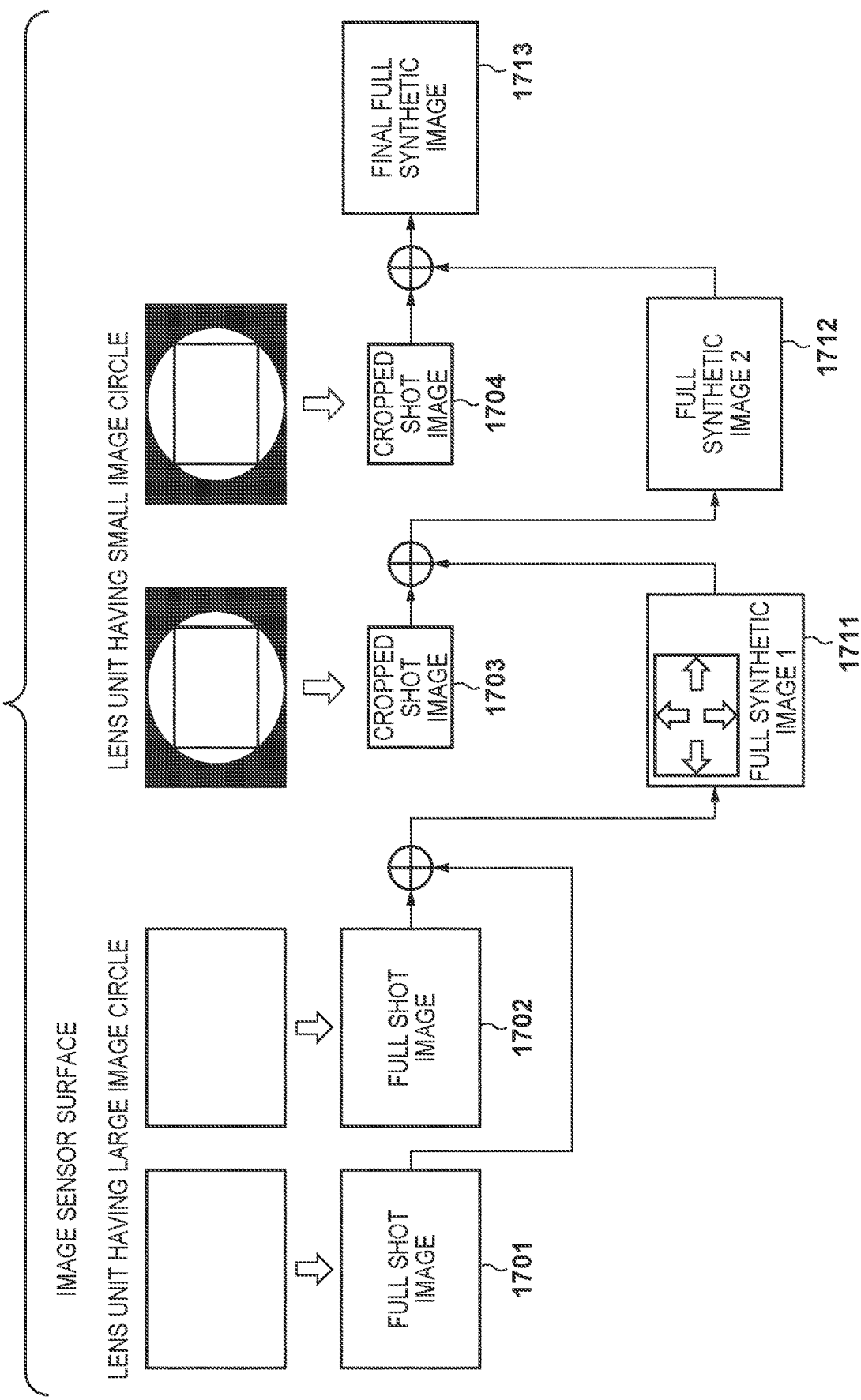
FIG. 17 is a diagram illustrating one example of a synthesizing sequence of image synthesis processing in the fifth embodiment.

FIG. 17 shows an example in which first and second images are captured using a lens unit whose image circle is large (full-size lens unit), third and fourth images are captured using a lens unit whose image circle is small (APS lens unit), and the size of the ultimate synthetic image designated by the user is the size of an image whose image circle is large.

Since images 1701 and 1702 are pieces of full-size image data obtained by performing capturing using a lens unit having a large image circle, designation of the synthesis position by the user is not performed when synthesizing these images. The image processing unit 124 creates a synthetic image 1711 (full-size image) by simply synthesizing these two images 1701 and 1702. Since the third image was captured by using a lens unit having a small image circle, the image processing unit 124 creates an image 1703 by cropping the full-size image obtained by the image capturing device 122. The user has selected a larger image size as the size of the ultimate synthetic image. Therefore, the image processing unit 124 creates a synthetic image 1712 (full-size image) by synthesizing the synthetic image 1711 (full-size image) and the image 1703 (cropped image). Note that the synthesis position of the image 1703 on the synthetic image 1711 is designated by the user. Also, since the fourth image was captured by using a lens unit having a small image circle, the image processing unit 124 creates an image 1704 by cropping the full-size image obtained by the image capturing device 122. The user has selected a larger image size as the size of the ultimate synthetic image. Therefore, the image processing unit 124 creates an ultimate synthetic image 1713 (full-size image) by synthesizing the synthetic image 1712 (full-size image) and the fourth image 1704 (cropped image). Note that the synthesis position of the image 1704 on the synthetic image 1712 is designated by the user.

Figure 18:
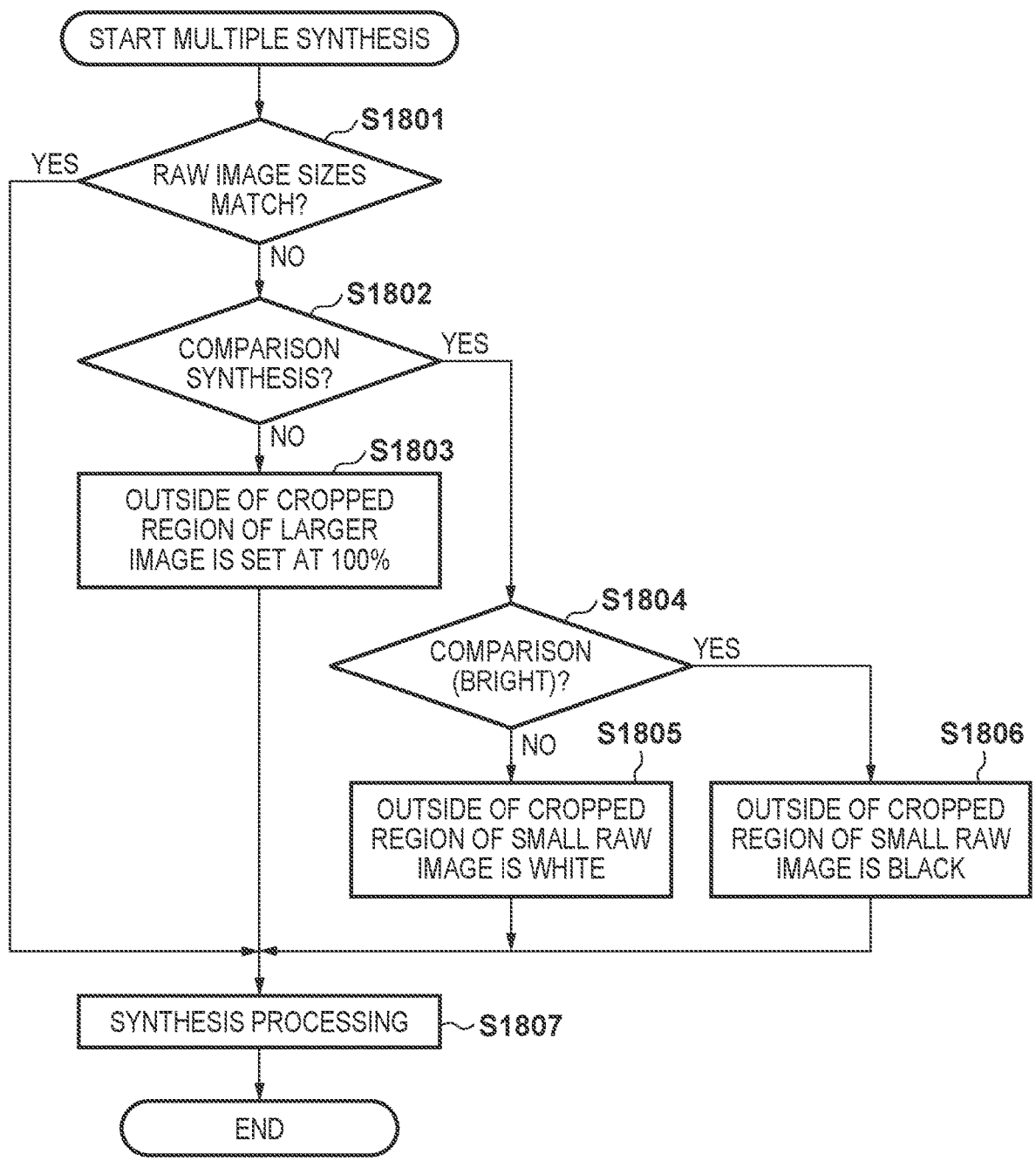
FIG. 18 is a flowchart of multiple-synthesis processing in the fifth embodiment.

Next, the multiple-synthesis processing of the image processing unit 124 in the embodiment will be described with reference to FIG. 18. This multiple-synthesis processing is the processing in step S1312 in FIG. 13.

In step S1801, the image processing unit 124 judges whether or not the size of the RAW shot image obtained in step S1309 matches the size of the image on which synthesis is to be performed. If it is judged that the sizes are the same (YES in step S1801), the image processing unit 124 advances the processing to step S1807, and if not (NO in step S1801), the image processing unit 124 advances the processing to step S1802.

In step S1802, the image processing unit 124 judges whether or not the comparison synthesis has been selected as the synthesis method of multiple-exposure imaging in the menu setting. If it is judged that the comparison synthesis has been selected as the synthesis method of multiple-exposure imaging (YES in step S1802), the image processing unit 124 advances the processing to step S1803, and if it is judged that the comparison synthesis has not been selected (NO in step S1802), the image processing unit 124 advances the processing to step S1804.

In step S1803, the image processing unit 124 configures the setting such that the pixel values of the full-size image outside the region of the cropped RAW image are kept at 100%, and advances the processing to step S1807.

In step S1804, the image processing unit 124 judges which of bright and dark has been selected in the comparison synthesis in the menu setting. If it is judged that the synthesis of relatively bright portions has been selected (YES in step S1804), the image processing unit 124 advances the processing to step S1806, and if it is judged that the synthesis of relatively bright portions has been selected (NO in step S1804), the image processing unit 124 advances the processing to step S1805.

In step S1806, the image processing unit 124 configures the setting such that the region outside the region of the cropped RAW image is a black region (all components are at minimum luminance), and advances the processing to step S1807. In step S1805, the image processing unit 124 configures the setting such that the region outside the region of the cropped RAW image is a white region (all components are at maximum luminance), and advances the processing to step S1807.

In step S1807, the image processing unit 124 performs the synthesis processing according to the condition set in steps S1803, S1805, and S1806 at a designated synthesis position if the synthesis position has been designated by the user, and stores the synthesized image data to the memory 132.

According to the present embodiment as described above, the multiple-exposure imaging can be continued even if, in a camera in which the lens unit can be unmounted and mounted, the lens unit is switched to a lens unit having a different image circle size, and moreover, the synthesis can be performed at a position in the image desired by a user.

Note that, in the embodiment described above, at least a live image is displayed in the display unit 128 when the multiple-exposure imaging is performed, but the configuration may be such that a synthetic image of two images may be displayed only when positioning is performed in synthesis processing. Also, in the embodiment described above, a user selects the size of the ultimate synthetic image every time images of different image circles are synthesized, but the configuration may be such that a final synthesis size is provided as a setting item for multiple-exposure imaging in FIG. 12, and the final synthesis size is determined when this setting is configured.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-120040, filed Jun. 25, 2018, and Japanese Patent Application No. 2018-134477, filed Jul. 17, 2018 which are hereby incorporated by reference herein in their entirety.

What is claimed is:

1. An image capturing apparatus which has a first image sensor and can interchange a lens unit, comprising:
at least one processor and/or circuit configured to function as a control unit,
wherein the control unit performs a predetermined synthesizing process to perform a plurality of image captures using the first image sensor and to create a synthetic image from a plurality of images obtained by the plurality of captures,
wherein, in the predetermined synthesizing process, in a case where, a first lens unit for the first image sensor is remounted after a first image capture is performed to create the synthetic image in a state in which a second lens unit for a second image sensor whose size is smaller than the size of the first image sensor is mounted,
the control unit
continues the predetermined synthesizing process which had been performed before the remount and enables capture of a second image, and
controls a display unit to display a live video which is obtained via the remounted first lens unit and for which a region of an image corresponding to the size of the second image sensor is cropped from a region of an image corresponding to the size of the first image sensor.

2. The apparatus according claim 1, wherein, the control unit controls the display unit to synthesize the live video and a first image obtained by the first capturing and to display the synthesized live video.

3. The apparatus according to claim 1, wherein the control unit enables a second image capture while the live video is displayed,
wherein the control unit, based on a first image obtained by the first image capture and a second image obtained by the second image capture, creates the synthetic image in which a region corresponding to the size of the second image sensor is cropped out of a region of an image corresponding to the first image sensor, and records the created synthetic image as a still image file to a recording medium.

4. The apparatus according to claim 1, wherein the first lens unit for the first image sensor has an image circle larger than that of the second lens unit for the second image sensor.

5. The apparatus according to claim 1, wherein the first image sensor is a full-size sensor and the second image sensor is an APS-C sensor.

6. The apparatus according to claim 1, wherein the predetermined synthesizing process is a process of obtaining a synthetic image by synthesizing a plurality of images obtained in multiple-exposure photography.

7. The apparatus according to claim 1, wherein each of images to be synthesized to create the synthetic image is obtained in response to a user's operation for capturing.

8. The apparatus according to claim 1, wherein a position of the region of the image corresponding to the size of the second image sensor to be cropped out of the region of image corresponding to the first image sensor can be set based on a user operation.

9. A method of controlling an image capturing apparatus which has a first image sensor and can interchange a lens unit, the method comprising:
performing a predetermined synthesizing process to capture a plurality of image using the first image sensor, and to create a synthetic image from a plurality of images obtained by the plurality of image captures,
wherein, in the predetermined synthesizing process, in a case where a first lens unit for the first image sensor is remounted after a first image capture is performed to create the synthetic image in a state in which a second lens unit for a second image sensor whose size is smaller than the size of the first image sensor is mounted,
continuing the predetermined synthesizing process which had been performed before the first lens unit is remounted; and
controlling a display unit to display a live video which is obtained via the remounted first lens unit and for which a region of an image corresponding to the size of the second image sensor is cropped from a region of an image corresponding to the size of the first image sensor.

10. A non-transitory computer-readable storage medium storing a program which causing an image capturing apparatus which has a first image sensor and can interchange a lens unit, to execute a method comprising:
performing a predetermined synthesizing process to capture a plurality of image using the first image sensor and to create a synthetic image from a plurality of images obtained by the plurality of image captures,
wherein, in the predetermined synthesizing process, in a case where a first lens unit for the first image sensor is remounted after a first image capture is performed to create the synthetic image in a state in which a second lens unit for a second image sensor whose size is smaller than the size of the first image sensor is mounted,
continuing the predetermined synthesizing process which had been performed before the first lens unit is remounted; and
controlling a display unit to display a live video which is obtained via the remounted first lens unit and for which a region of an image corresponding to the size of the second image sensor is cropped from a region of an image corresponding to the size of the first image sensor.

* * * * *